United States Patent [19]

Wakatsuki et al.

[11] Patent Number: 5,130,959
[45] Date of Patent: Jul. 14, 1992

[54] FRONT LOADING DISK PLAYER

[75] Inventors: Keizi Wakatsuki; Akira Shimizu; Tutomu Ogawa; Tomomichi Kimura, all of Saitama, Japan

[73] Assignee: Pioneer Electronic Corporation, Tokyo, Japan

[21] Appl. No.: 585,542

[22] Filed: Sep. 20, 1990

[30] Foreign Application Priority Data

Feb. 9, 1990 [JP] Japan .................................. 2-30712

[51] Int. Cl.$^5$ ...................... G11B 33/02; G11B 17/22; G11B 17/04; G11B 17/30
[52] U.S. Cl. .................................. 369/77.2; 369/77.1; 369/75.2; 369/35; 369/36; 369/178; 369/215
[58] Field of Search .................. 369/38, 77.2, 33, 34, 369/35, 36, 75.1, 75.2, 77.1, 77.2, 178, 215; 360/106, 132, 133, 98.04, 98.06

[56] References Cited

U.S. PATENT DOCUMENTS

| 4,139,876 | 2/1979 | Owens | 360/97 |
|---|---|---|---|
| 4,566,087 | 1/1986 | Kraft | 369/34 |
| 4,610,008 | 9/1986 | Ishibashi et al. | 369/34 |
| 4,689,782 | 8/1987 | Tsuchiya et al. | 369/270 |
| 4,730,292 | 3/1988 | Hasegawa et al. | 369/36 |
| 4,737,945 | 4/1988 | Yamazaki et al. | 369/270 |
| 4,739,422 | 4/1988 | Kamei | 360/106 |
| 4,742,411 | 5/1988 | Horio et al. | 360/106 |
| 4,750,067 | 6/1988 | Gerfast | 360/106 |
| 4,799,209 | 1/1989 | Grobben | 369/75.2 |
| 4,800,554 | 1/1989 | Yamasaki et al. | 369/291 |
| 4,809,252 | 2/1989 | Ikedo et al. | 369/36 |
| 4,858,047 | 8/1989 | Cannon et al. | 360/106 |
| 4,888,656 | 12/1989 | West | 360/106 |
| 4,893,206 | 1/1990 | Shtipelman et al. | 360/106 |
| 4,995,025 | 2/1991 | Schulze | 360/106 |

FOREIGN PATENT DOCUMENTS

| 0149532 | 7/1985 | European Pat. Off. |
| 0389878 | 10/1990 | European Pat. Off. |
| 3534529 | 4/1986 | Fed. Rep. of Germany |

Primary Examiner—Stuart S. Levy
Assistant Examiner—Tan Nguyen
Attorney, Agent, or Firm—Sughrue, Mion, Zinn, Macpeak & Seas

[57] ABSTRACT

A front loading disk player comprising a play unit which is arranged inside the player housing and includes a turntable, a pickup, and a disk clamp mechanism, a disk holding unit for holding disks to be inserted through an insertion opening formed in the player, and a play unit transfer mechanism for moving the play unit to load it into the disk. The play unit transfer mechanism comprises a movable carrying member, arranged so as to be movable in parallel with the recording surface of the disk, for carrying the play unit; and a carrying member drive unit for moving the movable carrying member. As a result of this construction, the front loading disk player is not only extremely small in structure but also capable of containing and playing a plurality of disks properly and smoothly.

6 Claims, 19 Drawing Sheets

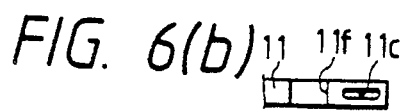
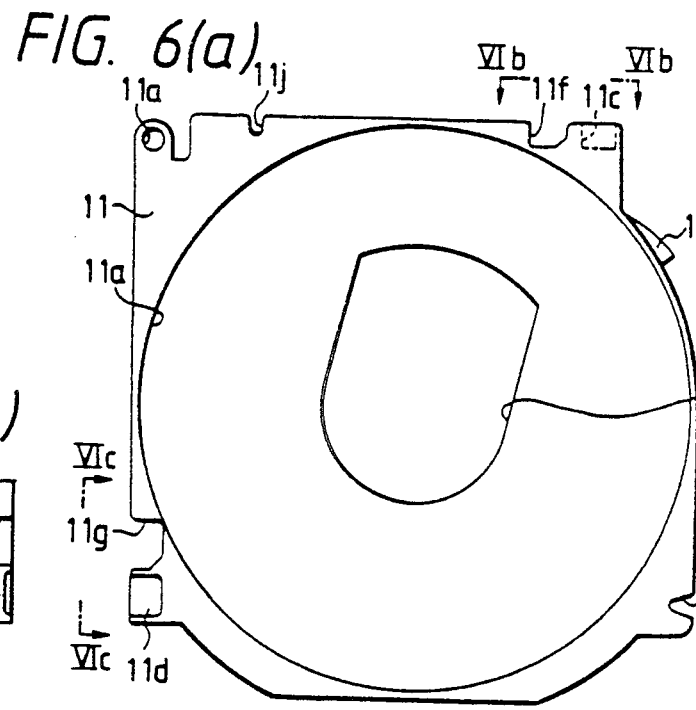
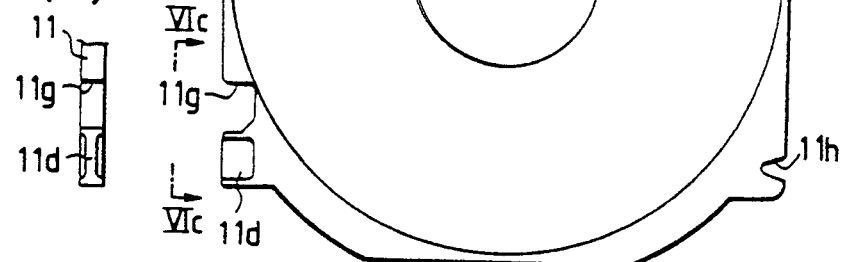
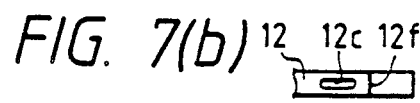
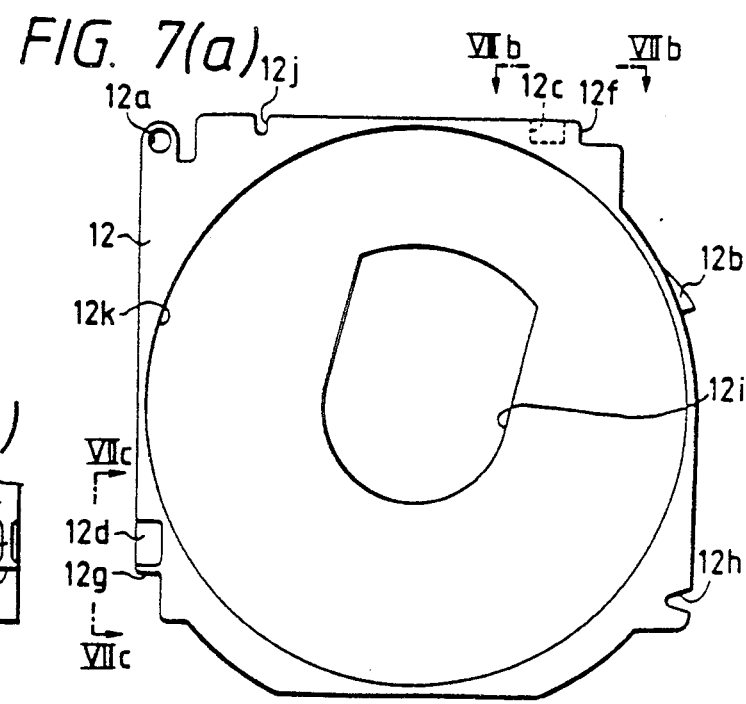

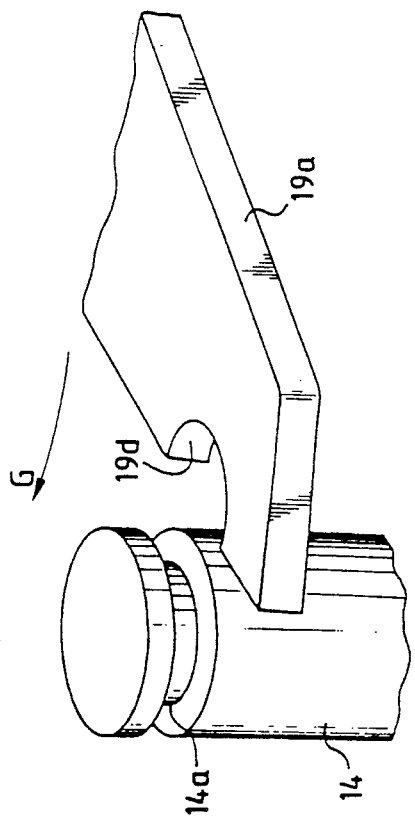
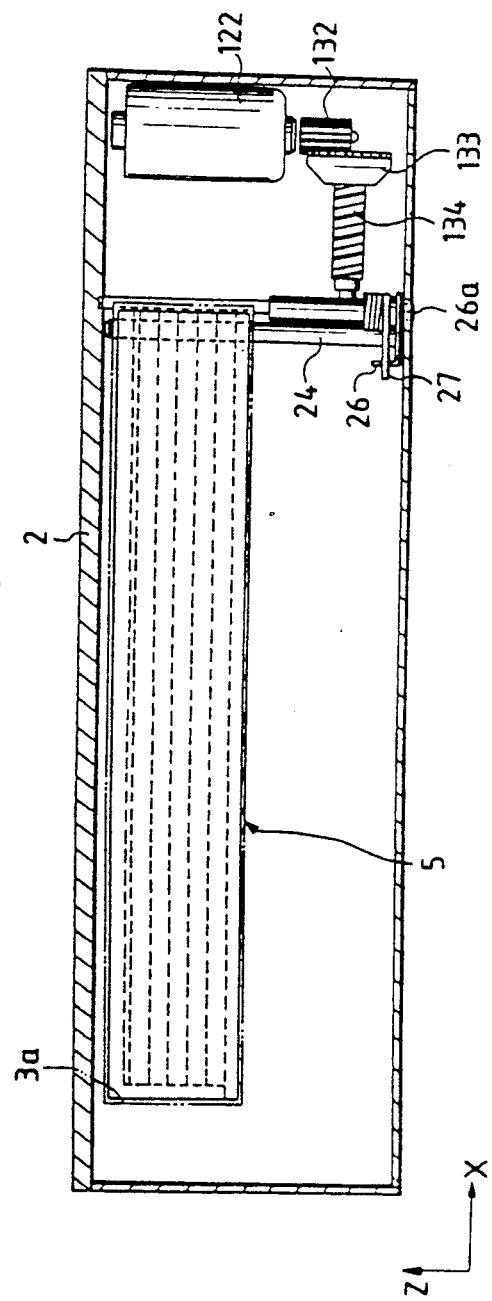

FRONT LOADING DISK PLAYER

BACKGROUND OF THE INVENTION

This invention relates to front loading disk players.

Front loading disk players are constructed so as to allow articles to be placed on the player unit. In particular, a data recording disk (hereinafter referred to simply as "disk") is supplied into a player housing through an insertion opening arranged on the front panel of the player housing.

There are many types of front loading disk player available. For example, a front loading disk player disclosed in Japanese Patent Un-examined Publication No. 61-80554 is of a slot-in type, in which a slot that is thin and long enough to insert a disk therethrough is formed on the front panel as an insertion opening and a disk inserted through this slot is loaded onto a turntable by being transferred in a direction parallel to the main surface of the disk or in a direction vertical to such a direction. Further, as disclosed in Japanese Patent Un-examined Publication No. 62-291748 and the like, is a front loading disk player of an ejectable carrier type. This type of player has a carrier that is ejectable through a rectangular opening formed on the front panel and causes a disk to be carried on the carrier which is ejected out of the player housing and loads the disk onto the turntable by moving the carrier in two directions, i.e., horizontal and vertical directions. Still further, as disclosed in Japanese Patent Un-examined Publication No. 64-52250, there is a multidisk-containing player capable of continuously playing a plurality of disks. This type of player has a magazine for accommodating a plurality of disks in an array and the magazine is inserted releasably into the loading section within the player housing through an insertion opening arranged on the front panel. The player also has a disk selecting and transferring mechanism which sequentially selects a disk contained in the magazine and transfers the selected disk in two directions, parallel to the main surface of the disk and vertical thereto, thereby to transfer the disk to the turntable.

As described above, to load any desired disk with the conventional front loading disk players, this would include transferring the disk whose surface area is large. As a result, it is necessary to secure space large enough to move the disk within the player housing, and this makes it difficult to reduce the size of the player.

Further, there is a growing demand in recent years for a front loading disk player which can be mounted close to the driver of a car. However, the space allowed for the player in the vicinity of the driver is so small that it is difficult to respond to the above demand by only employing the conventional construction.

SUMMARY OF THE INVENTION

The present invention has been made in view of the above problems and has, therefore, as an object the provision of a front loading disk player which is extremely small in structure.

The front loading disk player according to the present invention comprises: play means which is arranged inside the player housing and includes a turntable, a pickup, and a disk clamp mechanism; disk holding means for holding disks to be inserted through an insertion opening formed in the player; and a play means transfer mechanism for moving the play means to load it into the disk. The play means transfer mechanism comprises: a movable carrying member, arranged so as to be movable in parallel with the recording surface of the disk, for carrying the play means; and a carrying member drive means for moving the movable carrying member.

The front loading disk player thus constructed, upon reception of a play instruction with a disk to be played being held by the disk holding means, causes the movable carrying member to move to thereby cause the play means including the turntable to be loaded to the disk, and thereafter causes the disk clamp mechanism to clamp the disk and the pickup to operate to start playing the disk.

BRIEF DESCRIPTION OF THE DRAWINGS

FIG. 6 (a) is a plan view of a tray contained by the magazine shown in FIGS. 2 to 5; FIGS. 6 (b) and (c) are views respectively taken along lines VIb—VIb and VIc—VIc of FIG. 6 (a);

FIG. 7 (a) is a plan view of another tray contained by the magazine shown in FIGS. 2 to 5; FIGS. 7 (b) and (c) are views respectively taken along lines VIIb—VIIb and VIIc—VIIc of FIG. 7 (a);

FIG. 8 is a partially enlarged perspective view of the magazine shown in FIGS. 2 to 5;

FIGS. 10 to 12 are sectional views respectively taken along lines X—X, XI—XI, and XII—XII of FIG. 9;

DETAILED DESCRIPTION OF THE PREFERRED EMBODIMENTS

A description of a multidisk-containing player which is an embodiment of the present invention will be described below with reference to the accompanying drawings.

The multidisk-containing player has as a main portion a player housing 2 which is removably inserted and loaded into a space for holding it through an insertion opening formed, for example, in a dashboard (not shown) of a car. The front portion of the player housing, i.e., a front panel, is exposed to the outside of the holding space.

Figure 1:
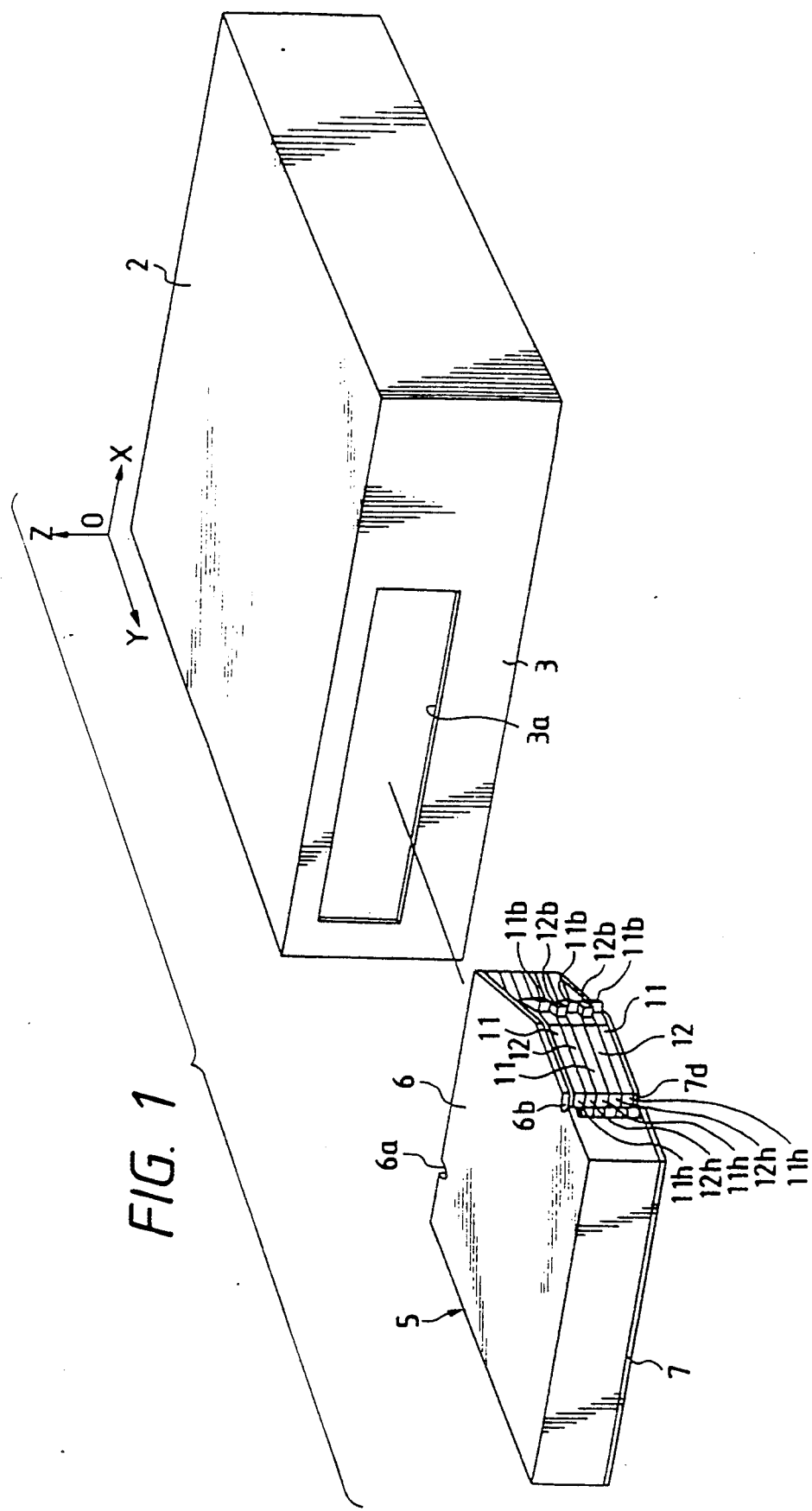
FIG. 1 is a general perspective view of a multidisk-containing player according to the present invention.

As shown in FIG. 1, the front panel 3 forming the front portion of the player housing 2 has a rectangular insertion opening 3a for inserting and loading a magazine 5 in a loading section inside the player housing. The insertion opening 3a is horizontally elongated. In the figure, arrow X indicates a direction to the left and arrow Y a frontal direction as viewed from the origin O. Arrow Z indicates an upward direction. Although not shown in the figure, the front panel 3 is provided with an operation unit for operating the multidisk-containing player and a display unit for displaying the operational condition or mode and like information of the player.

As shown in FIGS. 1 to 5, the magazine 5 has a generally flat, rectangular-pillar-like housing consisting of an upper member 6 and a lower member 7 which are separable from each other and has two kinds of substantially rectangular-plate-like trays 11 and 12, each of which is arrayed within the housing and can carry a disk 9 on the main surface thereof. The lower member 7 is formed merely as a substantially rectangular plate so as to form only the bottom portion of the housing, while the upper member 6 combines the rectangular plate main portion and a suspended portion extending downward around the periphery thereof integrally therewith so as to constitute both the top and lateral portions of the housing.

Figure 2:
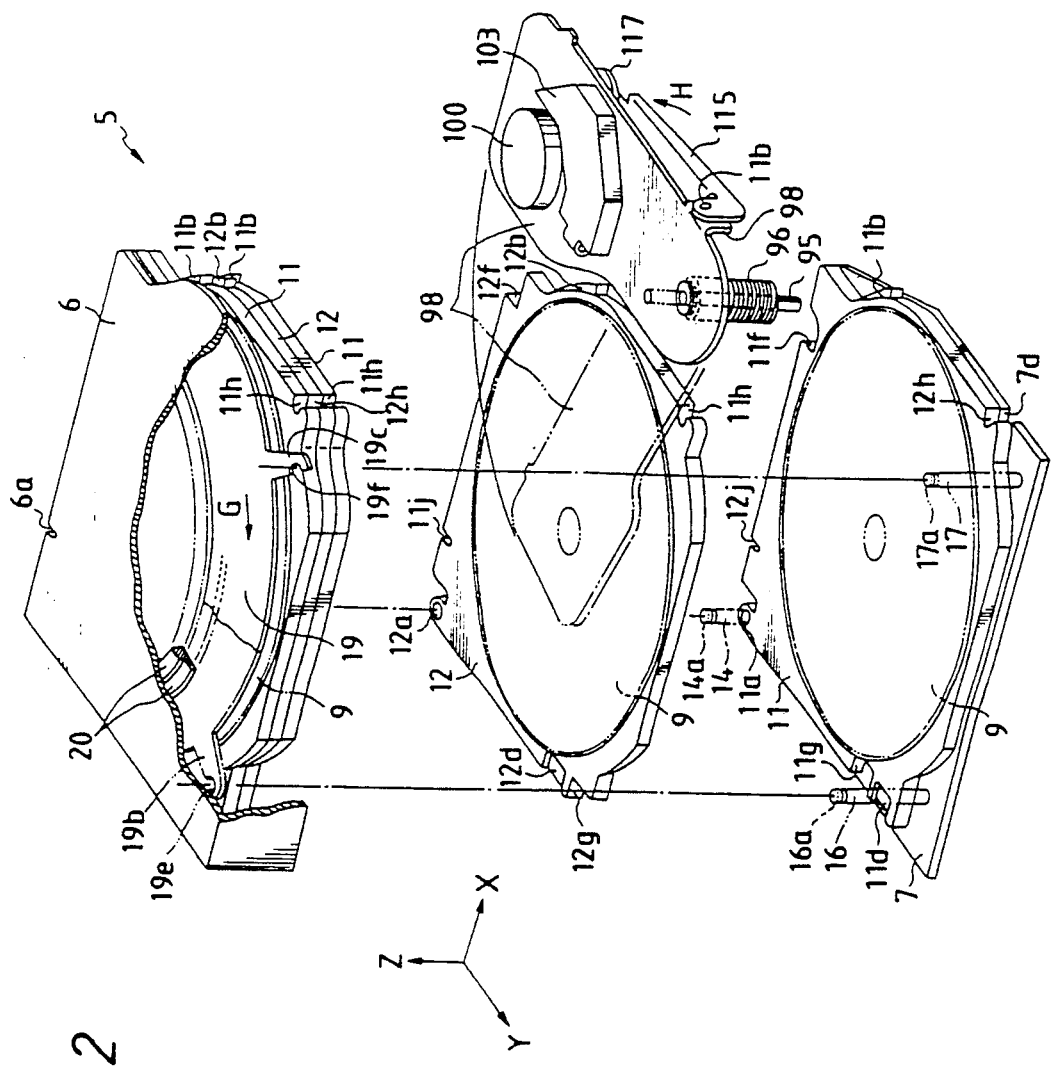
FIGS. 2 and 3 are a diffusely exploded perspective view and a plan view, respectively, including a partial section of a magazine employed in the multidisk-containing player.

The tray 11 consists of three pieces and the tray 12 consists of two pieces, and they are alternately arrayed. The trays 11 and 12 have round holes 11a and 12a, respectively, at a corner thereof, and, as shown in FIG. 2, these round holes are smoothly fitted with a cylindrical member 14 projected on the inner wall of a corner of the lower member 7. Thus, as is apparent from FIG. 3, each tray can turn around this cylindrical member 14, thereby being made projectable and installable with respect to the housing comprising the upper and lower members 6, 7. As is particularly clear from FIGS. 6 (a) to (c) and FIGS. 7 (a) to (c), the two kinds of trays 11, 12 are substantially identical in profile except for the following points.

That is, pawls 11b, 12b that are touched by the operator's finger when he extracts these trays from the magazine 5 are located at different positions and arranged so as to be staggered from each other on a plane parallel to the main surface of the tray. Because of such a construction, when, for instance, the pawl 11b of the tray 11 is touched, the finger does not interfere with the pawl 12b of the other tray 12 adjacent to the tray 11, thereby making the operation of inserting and releasing the trays to and from the magazine easy.

Further, on ends of each tray 11 or 12, or more specifically in this case, on the imaginary line that passes through the center of the disk carrying surface along such surface, i.e., in a diagonal connecting two opposite corners of the rectangular-plate-like tray or its vicinity, are two types of supported portions 11c, 11d or 12c, 12d for allowing a plurality of tray supporting arms to support each tray formed. The tray supporting arms constitute separating and positioning means (described later). As is apparent from FIGS. 6 (a) and (b) and FIGS. 7 (a) and (b), the supported portions 11c and 12c are grooves formed on the end surface of the tray. Also, as shown in FIGS. 6 (a) and (c) and FIGS. 7 (a) and (c), the other supported portions 11d and 12d are formed by recessing the main surface of the tray slightly deeper so that they are thinner than the other portions. These supported portions 11d and 12d do not necessarily have to be formed thinner but may be as thick as the other portions. However, the thin arrangement contributes to making the magazine 5 thinner.

As is clear from the figures, the supported portions 11c, 11d formed on the tray 11 and those 12c, 12d formed on the tray 12 adjacent to the tray 11 are arranged so as to be staggered from each other within a plane parallel to the main surface of the tray. That is, the supported portions 11c, 11d and 12c, 12d are not aligned along a line vertical to the main surface of each tray but are dispersed while staggered from each other along the main surface thereof. Such an arrangement contributes to reducing the space to be provided within the player housing 2 so that each tray supporting arm (described later) will be oscillated to separate each tray in a direction vertical to the main surface thereof. This facilitates not only a reduction in the size or, more correctly, in the thickness of the magazine 5 in this direction but also the thickness of the player as a whole.

As shown in FIG. 6 (a) to FIG. 7 (c), the trays 11, 12 respectively have notches 11f, 11g, 12f, and 12g adjacent to the supported portions 11c, 11d, 12c, and 12d. As will be described later, the notches help avoid interference between the tray supporting arms constituting part of the separating and positioning means (described later) and the trays adjacent to the tray supported thereby.

Figure 4:
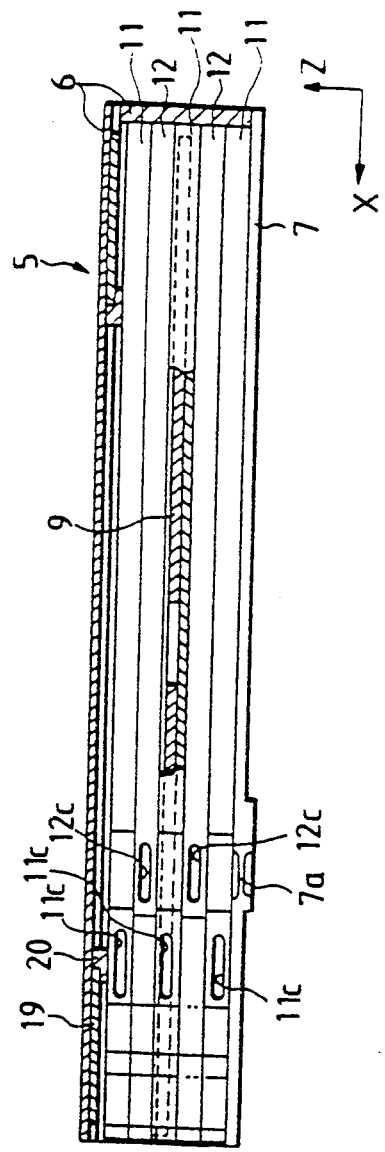
FIGS. 4 and 5 are views respectively taken along lines IV—IV and V—V if FIG. 3 including partial sections thereof.
Figure 5:
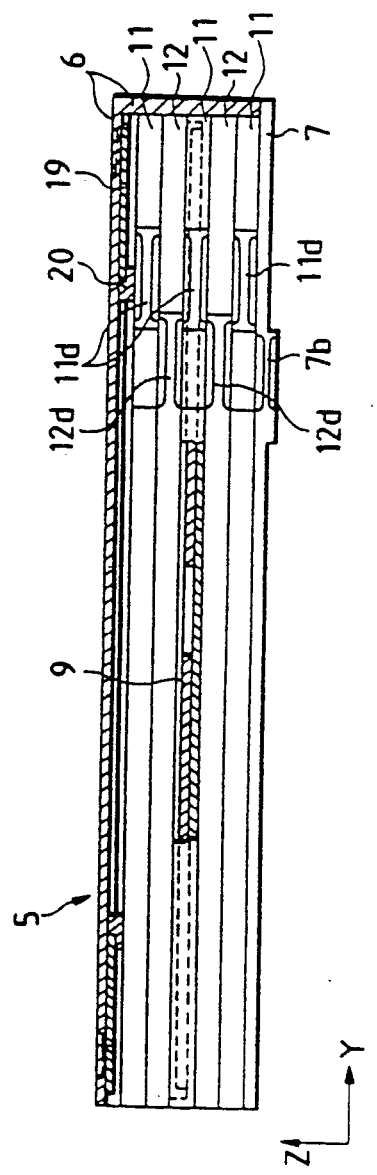

As is apparent from FIG. 6 (a) to FIG. 7 (c), on the main surface of the tray are round recesses 11h and 12h for positioning with the disk 9 accommodated therein and openings 11i and 12i for allowing a clamper (described later) to be inserted. Also, as shown in FIGS. 4 and 5, on an end of the lower member 7 forming part of the housing of the magazine 5 are supported portions 7a, 7b for being supported by the tray supporting arms (described later) of the separating and positioning means so as to provide portions thinner than the other portions. These supported portions 7a, 7b do not necessarily have to be thin but may be as thick as the other portions.

As shown in FIG. 2, at corners of the inner wall in the lower member 7 of the magazine 5 are two cylindrical members 16, 17 which are projected similar to the cylindrical member 14. The trays 11, 12 are also movable in the axial direction of the cylindrical member 14 which rotatably supports these trays, and the cylindrical member 14 acts not only as a member for axially supporting these trays but also as a member for guiding these trays so that they can be positioned in a planar manner. The arrangement in which a single cylindrical member 14 performs two functions contributes to eliminating one member from an arrangement wherein two members are required to perform such two functions individually.

As described above, the trays 11, 12 are ejected and accommodated into the magazine 5 by being rotated around the cylindrical member 14. It is conceivable that the movement for the tray ejecting and accommodating operation is not necessarily limited to rotation of the trays and a linear shuttle movement thereof is also applicable. However, the rotating operation is effective in always moving the trays smoothly, thereby improving the operability when the operator inserts or removes the trays to or from the magazine to load or replace disks.

A lock mechanism for locking together the upper member 6 and lower member 7 constituting the housing of the magazine 5 will now be described.

As shown in FIGS. 2 to 5, on the inner wall surface of the upper member 6 is a movable, disk-like and annular holding member 19 which is rotatably mounted along the main surface of upper member 6. In particular, as shown in FIGS. 2, 4 and 5, to the inner wall surface of the upper member 6 is a supporting member 20 secured on an upper end thereof by an adhesive or the like. The supporting member 20 is substantially L-shaped in cross section as taken at a right angle to the annular center thereof. The movable holding member 19 is disposed so as to be interposed between the bottom side of the supporting member 20 and the upper member 6 so that the movable holding member will be oscillatable around the inner periphery thereof. On the outer periphery of the movable holding member 19 are three projections 19a to 19c, the tip of each projection being provided with a semi-circular notch 19d, 19e, or 19f. These notches 19d to 19f are arranged so that they can be smoothly fitted with annular grooves 14a, 16a, and 17a formed at the tip of the three cylindrical members 14, 16, and 17 as the held portions on the outer peripheral surfaces. FIG. 8 shows a perspective view of the cylindrical member 14 and the projection 19a to be engaged therewith. The relationship between the other two cylindrical members 16, 17 and the projections 19b, 19c is the same as above. That is, when the notches 19d to 19f of the movable holding member arranged on the upper member 6 are respectively fitted with the annular grooves 14a, 16a, and 17a of the cylindrical members 14, 16, and 17 secured to the lower member 7, the upper member 6 and the lower member 7 are locked together. Upon removal of the fitted condition, both members become separable. The term "holding position" herein used means the position of the movable holding member 19 under the condition that the notches 19d to 19f are fitted with the annular grooves 14a, 16a, and 17a, and the term "non-holding position" means the position of the movable holding member 19 when released from such fitted condition.

Figure 3:
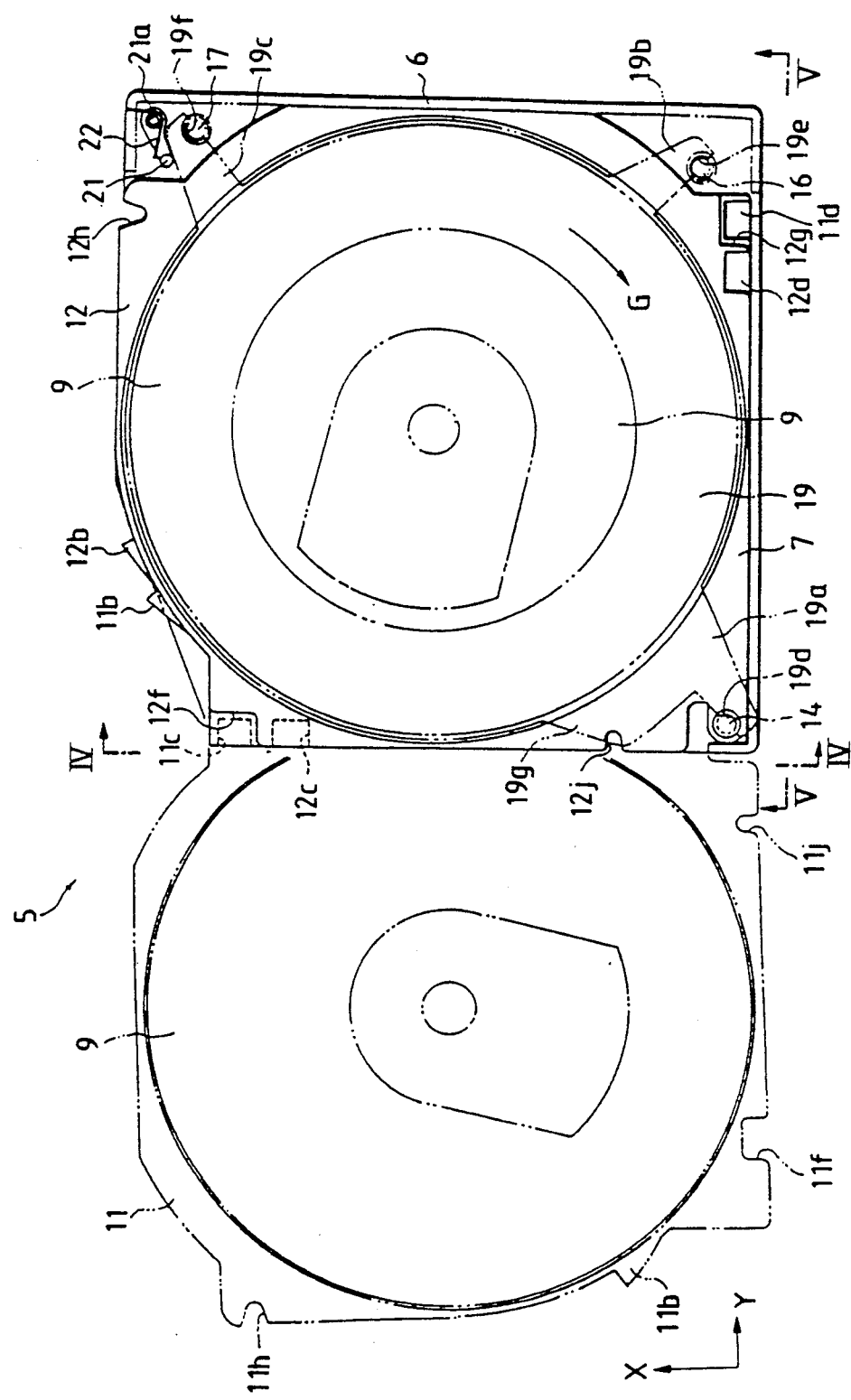

As shown in FIG. 3, on the lower member 7 and adjacent to the cylindrical member 17 is a biasing lever 21 oscillatably provided through a supporting pin 21a. The biasing lever 21 serves to bias the movable holding member 19 in a direction of fitting the notches 19d to 19f of the projections 19a to 19c with the annular grooves 14a, 16a, and 17a of the cylindrical members 14, 16, and 17 (i.e., direction of arrow G) through its engagement with the one projection 19c of the movable holding member 19. Also, a spring member 22 for applying a biasing force to the biasing lever 21 is inserted into the supporting pin 21a. The biasing lever 21 and the spring member 22 constitute biasing means for biasing the movable holding member 19 toward the holding position. The biasing means, the movable holding member 19, and the three cylindrical members 14, 16, and 17 functioning as the supported portions with which the movable holding member 19 is engaged constitute the lock mechanism for locking the upper and lower members 6, 7 together.

The provision of such a lock mechanism contributes to preventing the operator from carelessly separating the upper member 6, the lower member 7, and the accommodated trays during his handling the magazine 5 for the replacement or loading of a disk to the magazine 5 once he has locked the upper and lower members 6, 7 together by operating the lock mechanism.

As described above, the lock mechanism is so constructed as to lock both upper and lower members 6, 7 at three points simultaneously, thereby allowing respective parts of both upper and lower members 6, 7 to be combined together without any distortion. Further, the movable holding member 19 is constructed so as to be substantially disk-shaped and rotated along the main surface of the upper member 6, thereby making the space to be provided within the magazine 5 small to allow the operation of the movable holding member 19. Thus, such a construction contributes to miniaturization of not only the magazine 5 itself but also the player as a whole. However, it goes without saying that the shape and movement of the movable holding member 19 is not limited to the above example but may take various forms, e.g., an oscillatable arm-like structure or a linearly shuttlable lever-shaped structure.

Further, as described above, the three cylindrical members 14, 16, and 17 serving as the axial support and guide for the trays also serve as the mechanism for releasing the locking together of the upper and lower members 6, 7, and this allows the number of parts to be reduced.

The play means transfer mechanism that moves the play means including a turntable, a pickup, and a disk clamp mechanism to load the play means to a disk to be played within the loaded magazine 5 will now be described.

As shown in FIGS. 9 to 12, the magazine 5 is loaded by inserting it to the loading section within the player housing 2. The upper and lower members 6, 7, and the end in the direction of insertion and the lateral ends of the trays 11, 12 constituting the magazine 5 are provided with notches 6a, 6b, 7d, 11j, 11k, 12j, and 12k (see also FIGS. 1 and 2) which are linearly aligned in the direction of arraying the trays so as to generally form two grooves. The notches of the lower member 7 in the direction of inserting the magazine are not shown.

Figure 9:
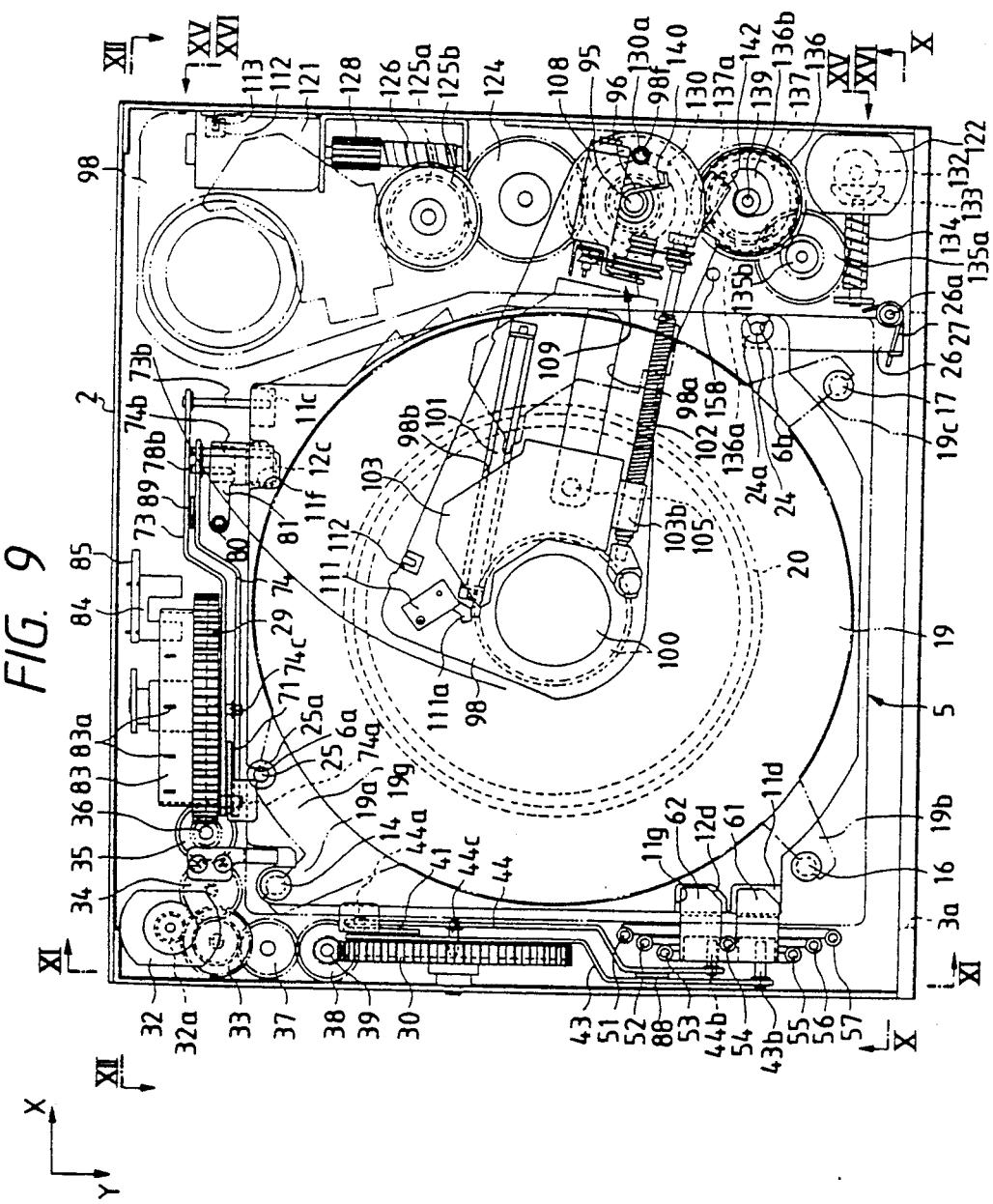
FIG. 9 is a plan view showing the internal mechanism of the multidisk-containing player shown in FIG. 1.
Figure 13:
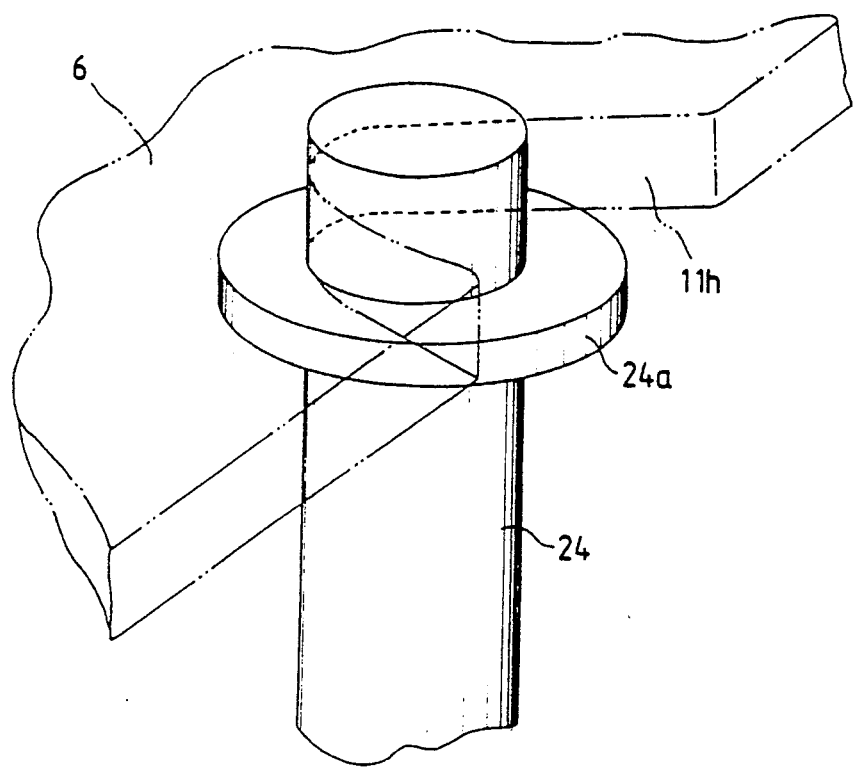
FIGS. 13 and 14 are an enlarged perspective view and an enlarged view, respectively, showing part of the internal mechanism shown in FIG. 9.

As shown in FIGS. 9 and 10, within the player housing 2 are two guide shafts 24, 25 arranged so as to extend vertically so that the guide shafts can be fitted with the two longitudinal grooves formed by the notches. One guide shaft 25 is fixed on the player housing 2. The guide shafts 24, 25 serve to guide the trays 11, 12 and the lower member 7 in slidable contact therewith in a separating direction. The trays and the lower member 7 are separated from one another as will be described later. As shown in FIG. 13, which is a perspective view of the one guide shaft 24, close to the upper ends of both guide shafts 24, 25 are collars 24a and 25a, which support the upper member 6 by fitting the notches 6a, 6b of the upper member 6 with the upper ends of the guide shafts 24, 25, thereby regulating the downward movement of the upper member 6. As described previously, while the guide shaft 25 is fixed on the player housing 2, the other guide shaft 24 is not only projected on the free end of a lever member 26 oscillatably arranged (i.e., swingable back and forth) through a supporting pin 26a on the player housing 2 but also biased in a direction toward the magazine 5 by a spring member 27. Accordingly, the guide shaft 24 is retracted with the lever member 26 being swung clockwise as viewed in FIG. 9 as the lever member 26 is pressed by the magazine 5 being inserted into the player housing 2. The guide shaft 24 never blocks the insertion of the magazine 5 and is fitted with the notches of the magazine 5 as the lever member 26 is returned to the original position by the biasing force of the spring member 27 upon completion of inserting the magazine 5.

As shown in FIGS. 3 and 9, on the disk-like movable holding member 19, which locks the upper and lower members 6, 7 of the magazine 5 together, is another projection 19g formed adjacent to the projection 19a integrally therewith. The projection 19a is one of the three projections 19a to 19c. The guide shaft 25 presses the projection 19g as the magazine 5 has been loaded into the player housing 2 as described above. This causes the movable holding member 19 to rotate counterclockwise as viewed in the figures, the projections 19a to 19c of the movable holding member 19 are released from the three cylindrical members 14, 16, and 17 held thereby, thus unlocking the upper member 6 from the lower member 7 and making them separable.

The play means transfer mechanism to be described below not only separates the upper and lower members 6, 7 of the magazine 5 thus made separable from each other but also separates the tray carrying the disk to be played from the other trays and then moves the play means including a turntable and the like to the disk so as to be loaded thereto.

First, the separating and positioning means constituting part of the play means transfer mechanism will be described.

Figure 11:
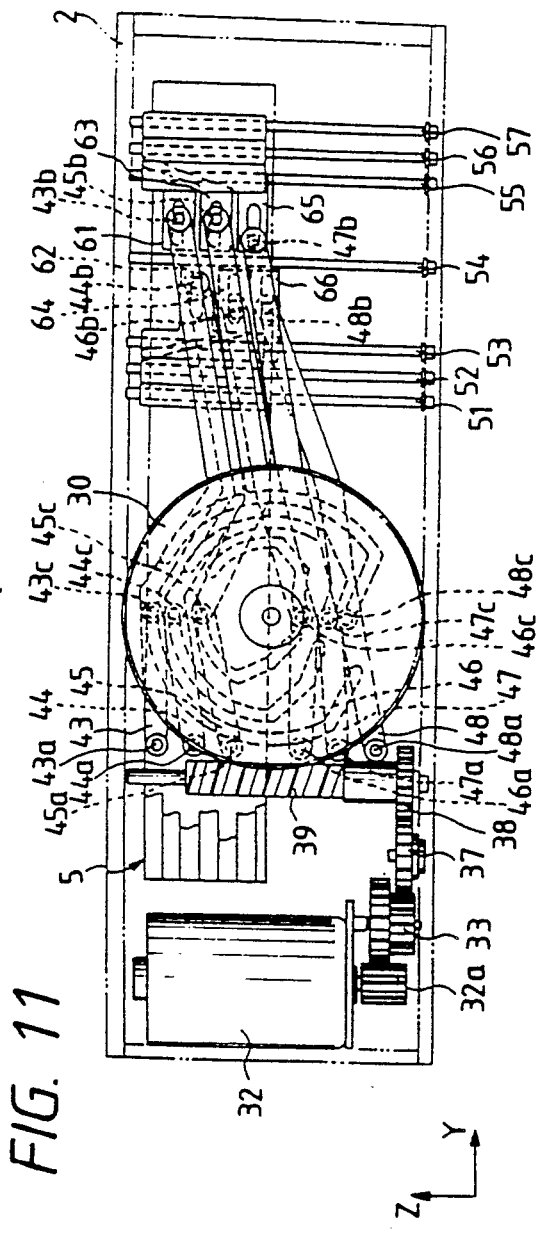
Figure 12:
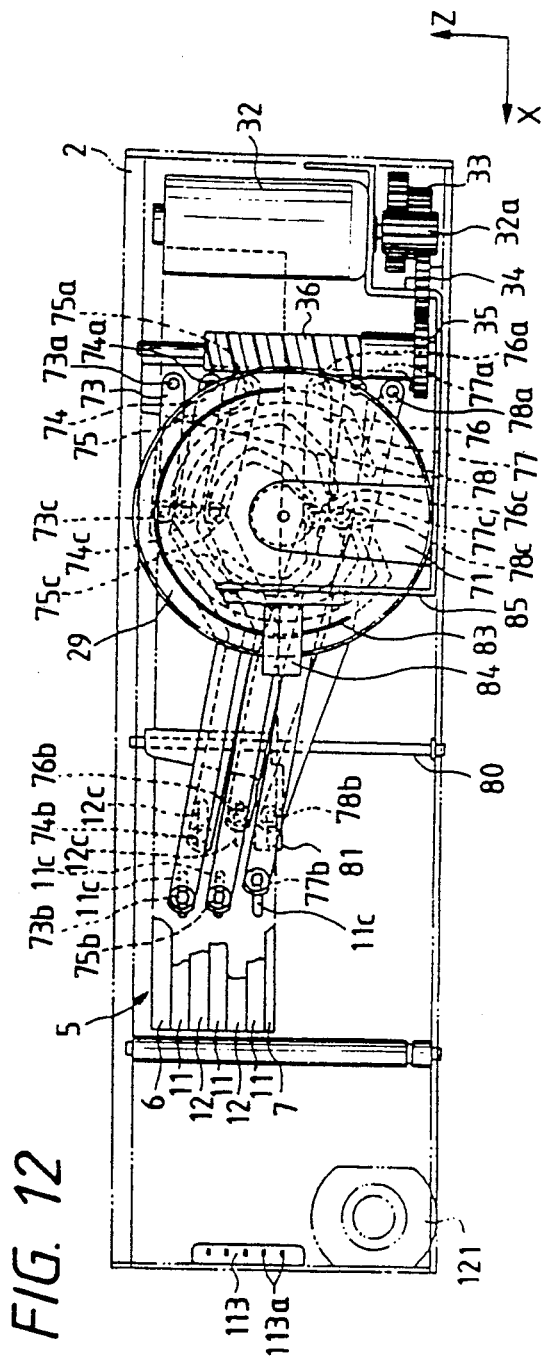

As shown in FIGS. 9, 11, and 12, two disk-like movable cam members 29, 30 are not only arranged within the player housing 2 so that the cam members are respectively positioned behind and at the right (when viewed from within the player) of the loaded magazine 5 and each of their main surfaces extends in a vertical direction of separating the upper and lower members 6, 7 and the trays (the direction of arrow Z and the direction opposite thereto) but also mounted so as to be rotatable with respect to the player housing 2. The outer peripheral surface of each cam member is formed into a worm wheel so that a torque will be provided through gears to be described below. As explicitly shown in FIG. 14, the main surface of the cam member 30 is provided with six cam grooves 30a to 30f, while the other cam member 29 is completely symmetrical with the cam member 30, and as is apparent from FIG. 12, six grooves similar to those of the cam member 30 are formed on the surface thereof. Such an arrangement that the cam members 29, 30 are made in a thin, disk-like form contributes to reducing the size of the space that they occupy, thereby increasing space utilization within the player housing and facilitating the miniaturization of the player.

As shown in FIG. 9, at the back of the player housing 2 is a motor 32 arranged so as to be interposed between the two cam members 29, 30. As shown also in FIG. 12, the cam member 29 is rotated by a torque applied by the motor 32 and transmitted through gears 32a, 33, 34, 35 and a worm 36. Further, as shown also in FIG. 11, the other cam member 30 receives from the motor 32 a torque that is sequentially transmitted through the gears 32a, 33, 37, 38 and a worm 39. Both cam members 29, 30 are driven in synchronization at the same speed by these torque applying means.

As shown in FIGS. 9 and 11, between the cam member 30 and the magazine 5 is a flat bracket 41 that extends vertically (the bracket 41 is not shown in FIG. 11). The bracket 41 allows six tray supporting arms 43 to 48 serving as tray supporting members to be oscillatably mounted vertically, i.e., in the direction of separating the lower member 7 and the trays of the magazine 5, through supporting pins 43a to 48a on the ends thereof. As shown in FIG. 11, on the other ends of the tray supporting arms 43 to 48 are pivotal supporting pins 43b to 48b inserted in parallel with the supporting pins 43a to 48a. Adjacent to the pivotal supporting pins are six slide pieces 61 to 66 that are slidably guided by seven guide shafts 51 to 57. The guide shafts are arranged so as to extend vertically. Each pivotal supporting pin is pivotally attached to each slide piece. More specifically, the lateral side of each of the slide pieces 61 to 66 is provided with an oval groove that extends horizontally and each pivotal supporting pin is slidably engaged with this groove. The five slide pieces 61 to 65 from the top among the six slide pieces respectively support the thin supported portions 11d, 12d formed on the trays 11, 12 within the magazine 5. The remaining slide piece 66 supports the thin supported portion 7b formed on the lower member 7 of the magazine 5.

Figure 14:
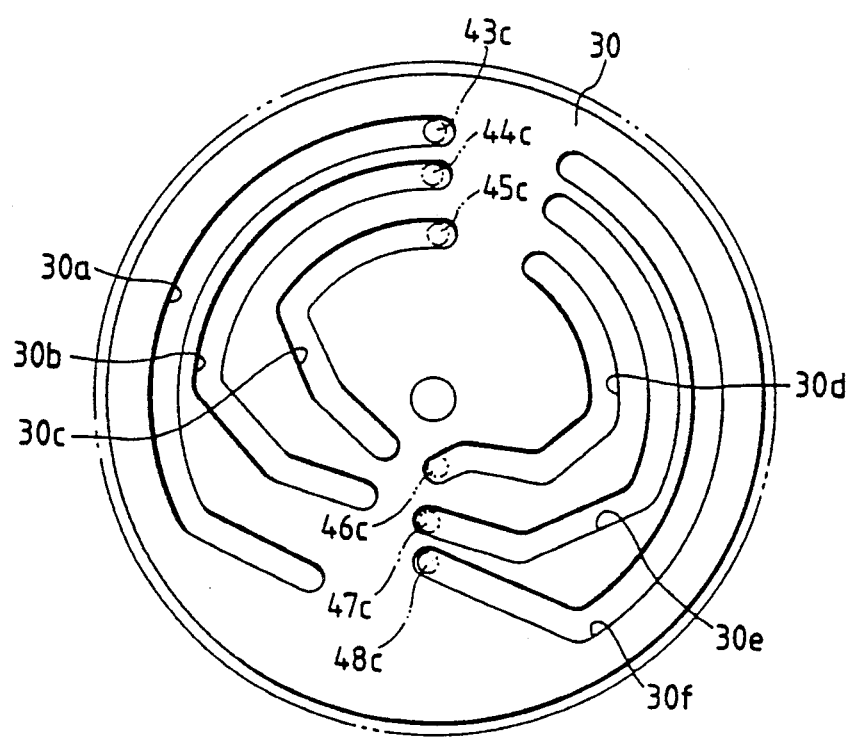

At the center of each of the six tray supporting arms 43 to 48 are slide pins 43c to 48c serving as cam followers inserted in parallel with the supporting pins 43a to 48a and the pivotal supporting pins 43b to 48b, and the upper ends of these slide pins are slidably engaged with the cam grooves 30a to 30f of the cam member 30 explicitly shown in FIG. 14. That is, the tray supporting arms 43 to 48 are constructed so as to be oscillated as necessary by the cam member 30 which is rotated by the motor 32. The oscillation timing of each tray supporting arm will be described in detail later with reference to the operation thereof.

As shown in FIGS. 9 and 12, between the other cam member 29 and the magazine 5 is also a flat bracket 71 that is to be extended vertically. The bracket 71 allows six tray supporting arms 73 to 78 serving as tray supporting members to be oscillatably mounted vertically through supporting pins 73a to 78a on the ends thereof. As shown in FIG. 12, on the other ends of the tray supporting arms 73 to 78 are pivotal supporting pins 73b to 78b inserted in parallel with the supporting pins 73a to 78a. The five pivotal supporting pins 73b to 77b from the top among the six pivotal supporting pins are smoothly engaged with the oval grooves that are the supported portions 11c and 12b formed on the trays 11, 12. Adjacent to the remaining pivotal supporting pin 78b is a slide piece 81 slidably arranged along a guide shaft 80 to be extended vertically. The pivotal supporting pin 78b is pivotally attached to the slide piece 81. More specifically, a horizontally extending oval groove is formed on the lateral side of the slide piece 81, and the pivotal supporting pin 78b is slidably engaged with this groove. The slide piece 81 supports the thin supported portion 7a formed on the lower member 7 of the magazine 5.

At the center of each of the six tray supporting arms 73 to 78 are slide pins 73c to 78c serving as cam followers inserted in parallel with the supporting pins 73a to 78a and the pivotal supporting pins 73b to 78b, and the upper ends of the slide pins are slidably engaged with six cam grooves provided on the main surface of the cam member 29. That is, the tray supporting arms 73 to 78 are constructed so as to be oscillated in synchronism with the other tray supporting arms 43 to 48 by the cam member 29 which is rotated by the motor 32.

As shown in FIGS. 9 and 12, the cam member 29 has, on the surface opposite to its cam surface, an arcuate address plate 83 firmly fixed concentrically therewith. The address plate 83 has six slits 83a formed with the rotation angle, 30°, of the cam member 29 being one pitch. To detect each slit, there is a photosensor 84 secured to the player housing 2 through a bracket 85.

The address plate 83 and the photosensor 84 serve to detect the positions of the angle of rotation of both cam members 29, 30, i.e., the oscillating positions of the tray supporting arms 43 to 48 and 73 to 78.

The motor 32, the gears 32a, 33, 34, 35, 37, and 38, and the worms 36, 39 constitute drive force applying means for applying a drive force to both cam members 29, 30, and the drive force applying means, together with the cam members 29, 30, constitutes supporting arm drive means, i.e., supporting member drive means, for oscillating the tray supporting arms 43 to 48 and 73 to 78. Also, the supporting arm drive means and the tray supporting arms constitute the separating and positioning means for not only separating the upper member 6 from the lower member 7 of the magazine 5 but also selecting a tray carrying a desired disk among the trays contained in the magazine 5 to thereby separate the selected tray from other trays in a direction vertical with respect to the main surface of the tray and position the separated tray. This separating and positioning means may herein be referred to as the "disk supporting means" whenever applicable. That is, a disk to be played, which is carried on a tray, is separated from the other trays and properly positioned and held by the separating and positioning means. Then, the play means, including a turntable, approaches the disk in a position to be loaded thereto and to start playing.

The separating and positioning means will now be described in more detail.

As described previously, the separating and positioning means has two groups of tray supporting arms, each group consisting of six arms and being driven by the cam member 29 or 30. The trays in the magazine 5 are supported by the groups of tray supporting arms at the supported portions 11c, 11d and 12c, 12d formed on the imaginary line passing through the center of the disk carrying surface of the tray along such a disk carrying surface or on the ends adjacent thereto. In other words, each tray that is formed as a rectangular plate is supported by each group of tray supporting arms on a diagonal connecting two opposite corners thereof or adjacent to such diagonal. On the other hand, the magazine 5 and the player housing 2 enclosing the magazine 5 are formed as rectangular pillars. In such a structure as the rectangular-pillar-like magazine 5 enclosed by the rectangular-pillar-like player housing 2, the distribution of the two sets of tray supporting arms to the opposite corners of each tray, i.e., adjacent to the two opposite corners of the entire magazine 5, may provide a comparatively large space at a portion located in the middle of both groups of tray supporting arms, i.e., at the corner portion in the back of the player housing 2. Accordingly, such space may accommodate the supported arm drive means including the cam members 29, 30 and the motor 32 efficiently.

As described above, there are two sets of tray supporting arms, each set consisting of six tray supporting arms, and each tray is supported at the two points adjacent to the diagonal thereof by the tray supporting arms so that the trays can be separated in a direction vertical to their disk carrying surface. However, as described previously, each tray is guided by the two guide shafts 24, 25 properly following the predetermined path. Therefore, it is not necessary to support each tray at the two points and it may be possible to leave each tray supported at only one point by either one of the two sets of tray supporting arms, e.g., the tray supporting arms 43 to 48, to apply a moving force. Thus, the remaining set of tray supporting arms, or the tray supporting arms 73 to 78, results in functioning as tray inclination regulating means by supporting each tray in cooperation with the other set of tray supporting arms so that each tray is parallelly moved without being inclined. The tray supporting arms 43 to 48 may herein be referred to as the "first tray supporting member" and the tray supporting arms 73 to 78 which form the other set as the "second tray supporting member" whenever applicable.

The provision of such tray inclination regulating means allows the tray to move in parallel at all times without being inclined, thereby preventing the disk on the tray from being displaced from the proper position by the inclined tray and always performing the loading of the play means, including a turntable, to the disk properly and smoothly.

Since the function of the drive force applying means for applying a drive force to the tray supporting arms 73 to 78 serving as the tray inclination regulating means is generally assumed by the motor 32 that drives the tray supporting arms 43 to 48 governing the operation of separating the trays, it is not necessary to provide the drive force applying means dedicated to the tray inclination regulating means, thereby reducing the drive source.

Here, the construction of a set of tray supporting arms will be described in more detail. As shown in FIGS. 9 and 11, the six tray supporting arms 43 to 48, which is one set of tray supporting arms disposed at the side of the magazine 5 are arranged in a staggered fashion so as to be oscillatable along two imaginary planes that are different from each other. That is, the six tray supporting arms are distributed into two subsets; the tray supporting arms 43, 45, 47 forming one subset and the remaining three tray supporting arms 44, 46, 48 forming another subset. Thus, the above-noted planes, along which these subsets of tray supporting arms, move in a staggered fashion with respect to a horizontal plane. Because of such a construction, if it is so arranged that the two planes overlap one upon the other on a horizontal plane, such an arrangement will allow a projection area of each plane required for the movement of the trays, thereby facilitating miniaturization of the player as a whole, compared to the construction wherein all the tray supporting arms 43 to 48 are moved along one common imaginary plane.

Further, as shown in FIG. 9, between the one subset of tray supporting arms 43, 45, 47 and the other subset of tray supporting arms 44, 46, 48, both being arranged in a staggered fashion on a horizontal plane as described above, is a partition member 88 interposed so as to partition these two subsets. The partition member 88 guides the tray supporting arms in both subsets properly, thereby preventing any interference between these two subsets of tray supporting arms and allowing the operation to be performed smoothly.

On the other hand, as is clear from FIGS. 9 and 12, the six tray supporting arms 73 to 78 disposed at the rear of the magazine 5 are, similar to the tray supporting arms 43 to 48, distributed into two subsets. These two subsets are arranged in a staggered fashion with respect to a horizontal plane, interposing a partition member 89 therebetween.

Although, as described above, the tray supporting arms 43 to 48 and 73 to 78 are formed so as to be oscillatable, their movement is not limited to oscillation but may be some other movement such as parallel movement. However, the arrangement allowing oscillation, such as above, provides the advantage that the tray supporting arms can always be operated properly and smoothly.

The mechanism constituting the play means transfer mechanism together with the separating and positioning means will now be described.

As shown in FIGS. 2, 9, 15, and 16, in the player housing 2 is a cylindrical supporting shaft 95 extended in a vertical direction, i.e., in a direction of separating the trays so as to be positioned at the left of the loaded magazine 5 (as viewed from within the player housing). The cylindrical supporting shaft 95 is secured to a lower end portion of the player housing 2. On the supporting shaft 95 is a cylindrical male screw 96 rotatably fitted therewith from outside. At the upper end of the male screw 96, a flat-plate-like longitudinally movable carrying member 98 is fitted at an end thereof. The movable carrying member 98 extends horizontally. That is, the movable carrying member 98 is not only pivotable around the supporting shaft 95 in a direction perpendicular to the direction of separating the trays but also movable along the supporting shaft 95. The movable carrying member 98 also oscillates (i.e., moves back and forth) between the inserting position that allows it to be inserted between the separating trays and the non-inserting position that allows it to depart from the trays. The inserting position is the position of the movable carrying member 98 shown by the two-dot chain line in FIG. 2 and by the solid line in FIG. 9, and the non-inserting position is the position shown by the solid line in FIG. 2 and by the two-dot chain line in FIG. 9. The inserting position may also be referred to as the confronting position since the movable carrying member 98 can confront the recording surface of the disk 9 placed on the tray when the movable carrying member 98 is in this position. Also, the non-inserting position may likewise be referred to as the non-confronting position. The movable carrying member 98 can move along the supporting shaft 95 between the low position shown by the solid line and the high position shown by the two-dot chain line in FIG. 15.

Adjacent to the oscillating end of the movable carrying member 98 is a turntable 100. On the movable carrying member 98 are a guide shaft 101 and a worm 102 arranged in parallel with each other along the length thereof. One end 103b of a carriage 103 is screwed in the worm 102, while the other end thereof is slidably supported by the guide shaft 101. However, the guide shaft 101 and the worm 102 are not shown in FIG. 2.

Figure 16:
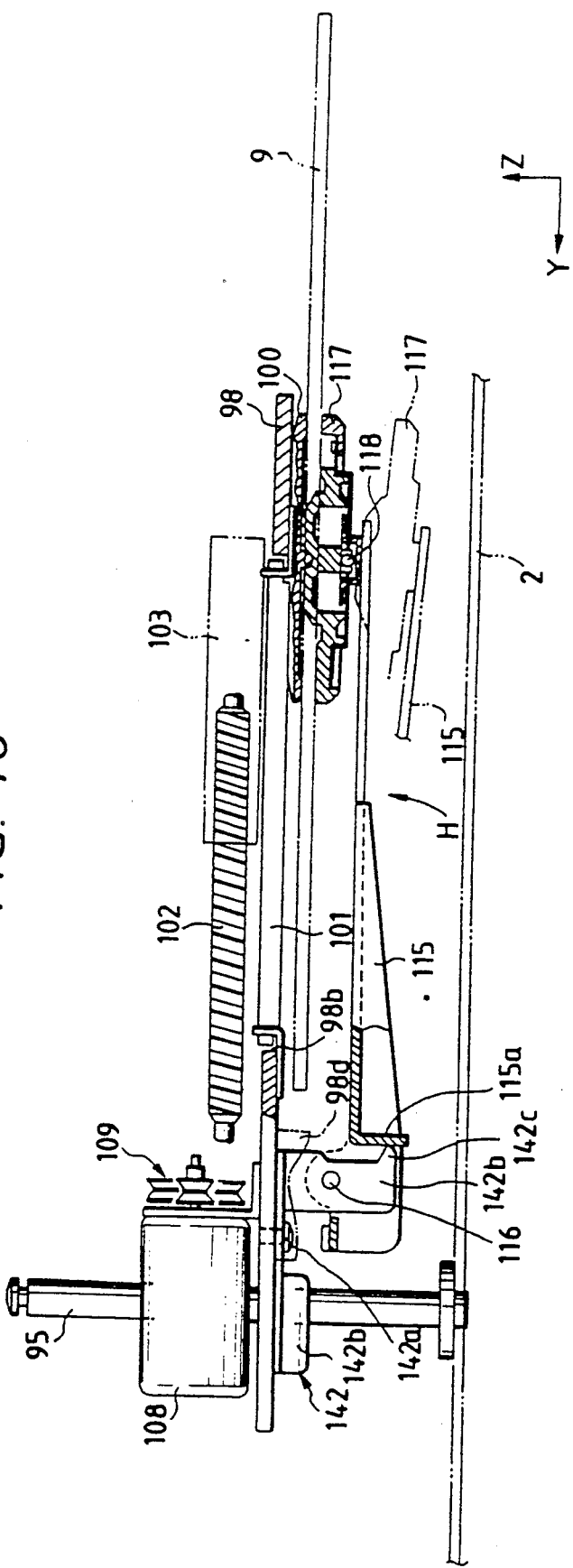

The carriage 103 has a built-in optical pickup including an objective lens 105 (shown in FIG. 9). Although the optical pickup, being the same as those of the known type, will not be described in detail, it includes a servomechanism for servo-driving the objective lens 105 in both focusing and tracking directions, and reads recorded data by transmitting a laser beam from a laser beam injecting device onto the recording surface of a disk and detecting a change in light reflected therefrom. As shown in FIG. 9, the movable carrying member 98 is provided with a substantially rectangular opening 98a for allowing the objective lens 105 to access the recording surface of the disk 9. As shown in FIGS. 9 and 16, the guide shaft 101 guiding the carriage 103 is arranged within another thin elongated opening 98b, and the opening 98b is used as space for accommodating the guide shaft 101. Accordingly, the space to be occupied by the guide shaft 101 is reduced and this contributes to miniaturization of the player.

As shown in FIGS. 9 and 16, the worm 102 is rotated by a motor 108 arranged on the side of the base end of the movable carrying member 98 receiving a torque through a power transmission mechanism 109 formed of a plurality of pulleys and two belts installed thereon. As shown in FIG. 9, on the oscillating end of the movable carrying member 98 is a detection switch 111 for detecting the arrival of the carriage 103 at its movement limit position closest to the turntable 100 upon operation of the carriage 103 which is triggered by its engagement with an operating strip 111a. Further, as shown in FIG. 9, on the movable carrying member 98 and adjacent to the detection switch 111 is a photosensor 112, and as shown in FIGS. 9 and 12, an address plate 113 formed of five vertically juxtaposed slits 113a detectable by the photosensor 112 when the movable carrying member 98 is in the non-inserting position is mounted on the left inner wall surface of the player housing 2.

The guide shaft 101, the worm 102, the motor 108, the power transmission mechanism 109, and the detection switch 111 constitute pickup guide drive means for guiding the carriage 103 with the pickup mounted thereon to bring it closer to or retract it from the turntable 100.

As shown in FIGS. 2 and 16, along the lower surface of the movable carrying member 98 is a clamper arm 115, which is pivotally mounted on a suspended portion 98d by a supporting pin 116 at one end thereof. The suspended portion 98d is formed so as to be extended downward adjacent to the base end of the movable carrying member 98. The clamper arm 115 is pivoted within a plane including a vertical direction. On the oscillating end of the clamper arm 115 is disposed a clamping member 117, or a clamper, rotatably mounted through a spherical bearing 118 (shown in FIG. 16) or the like, for clamping the disk 9 to be played onto the disk carrying surface of the turntable 100.

The clamper arm 115, the clamping member 118, and their fittings constitute a disk clamp mechanism for clamping the disk 9 onto the disk carrying surface of the turntable 100. Further, the disk clamp mechanism, the turntable 100, the optical pickup including the carriage 103, and the pickup guide drive means comprising the guide shaft 101, the worm 102, and the motor 108 are collectively referred to as the play means. That is, the movable, carrying member 98 serves to oscillate the play means by carrying it.

The carrying member drive means for oscillating the movable carrying member 98 and moving it along the supporting shaft 95 that is the supporting shaft for oscillation will next be described.

Figure 15:
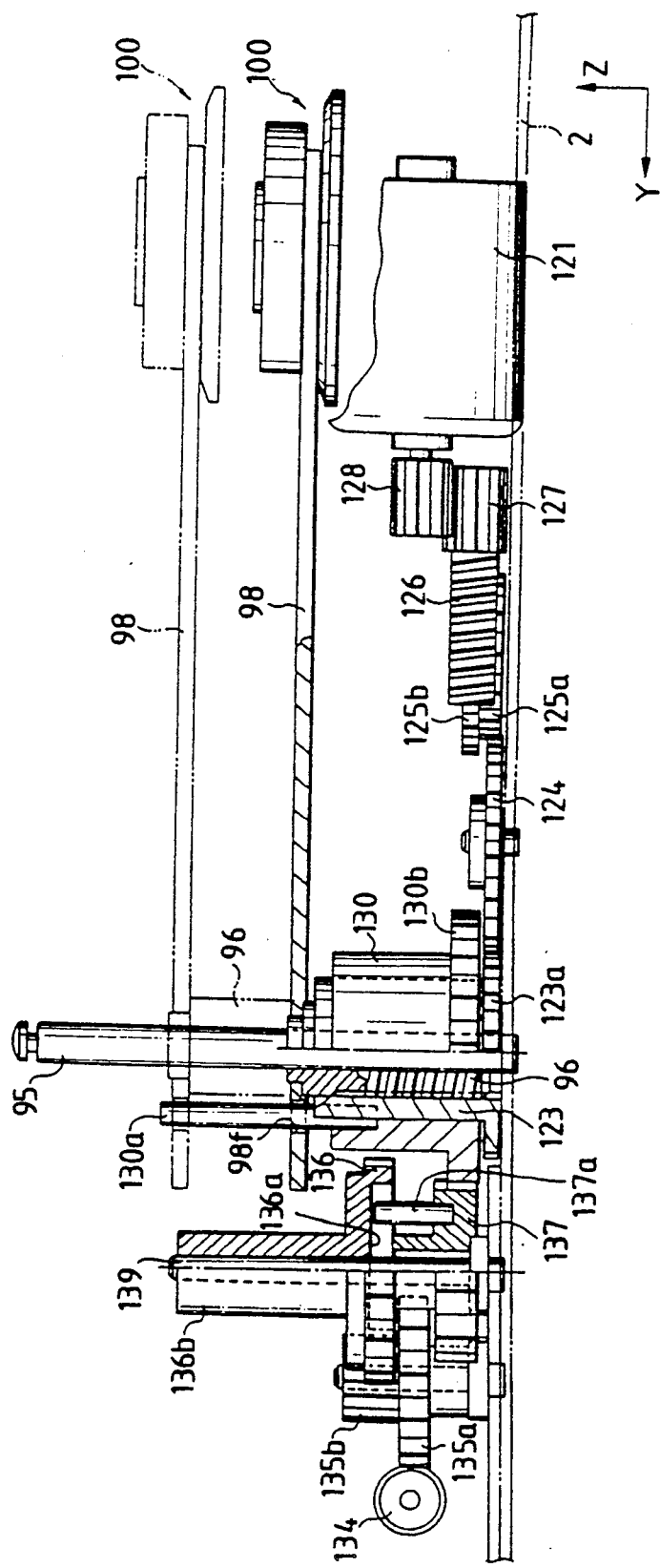
FIGS. 15 and 16 are views respectively taken along lines XV—XV and XVI—XVI of FIG. 9 including partial sections thereof.

FIG. 15 is a view taken along the line XV—XV of FIG. 9 including a partial section. As shown in FIGS. 9 and 15, arranged in the front and rear of the supporting shaft 95 for supporting the movable carrying member 98 are motors 121 and 122, respectively. The motor 121 disposed to the rear of the supporting shaft 95 serves to move the movable carrying member 98 along the supporting shaft 95, while the motor 122 disposed to the front is to oscillate or pivot the movable carrying member 98. As will be described later, the motor 122 provides a drive force also for the disk clamp mechanism.

As is clear from FIG. 15, a cylindrical female screw 123 is screwed onto the male screw 96 that carries the movable carrying member 98 by being rotatably and slidably fitted with the supporting shaft 95. At the lower end of the female screw 123 is a gear 123a formed integrally therewith. A torque from the motor 121 is transmitted to the gear 123a and the female screw 123 sequentially through gears 124, 135a, a worm wheel 125b, a worm 126, and gears 127, 128.

On the other hand, a cylindrical member 130 is rotatably fitted with the female screw 123 from outside, and on the upper end of the cylindrical member 130 a column-like pin 130a is projected. The pin 130a is inserted into a circular opening 98f formed on the movable carrying member 98 with a predetermined clearance. On the lower end of the cylindrical member 130 is a gear 130b formed integrally therewith, and a torque from the motor 122 is transmitted to 130b and the cylindrical member 130 sequentially through a gear 132, a face gear 133, a worm 134, a worm wheel 135a, a gear 135b, and gears 136, 137. The gears 136, 137 are not integral with each other but are pivotally supported concentrically by a shaft 139, and as shown also in FIG. 17, a pin 137a which projects from the upper main surface of the lower gear 137 is slidably fitted with an arcuate groove 136a formed on the lower main surface of the upper gear 136. Further, as shown in FIG. 9, a spring member 140 is fitted with the supporting shaft 95 for axially supporting the movable carrying member 98. The spring member 140 serves as biasing force applying means for applying a biasing force toward the non-inserting position, i.e., the position indicated by the two-dot chain line in FIG. 9.

The motors 121, 122, the gears 123a, 124, 125a, the worm wheel 125b, the worm 126, the gears 127, 128, the pin 130a, the gears 130b, 132, the face gear 133, the worm 134, the worm wheel 135a, the gears 135b, 136, 137, and the pin 137a constitute the torque applying means for applying a torque selectively to each of the female screw 123 and the cylindrical member 130. Also, the torque applying means, the female screw 123, the cylindrical member 130, and the male screw 96 constitute the carrying member drive means for causing the movable carrying member 98 to oscillate or pivot around and move along the supporting shaft 95. Further, the carrying member drive means, the movable carrying member 98, the supporting shaft 95, the separating and positioning means, and the spring member 140 for applying a biasing force to the movable carrying member 98 constitute the play means transfer mechanism for moving the play means made up of the turntable 100 and the like and loading it to a disk to be played.

Although, as described above, the movable carrying member 98 is to be oscillated, the movement of the movable carrying member 98 is not limited to oscillation but may be various other movements including parallel movement. However, the arrangement for oscillation allows the movable carrying member 98 to always be operated properly and smoothly.

Further, as described above, not only the movable carrying member 98 is oscillatably mounted on the supporting shaft 95 so that the movable carrying member can be oscillated between the inserting position allowing the insertion of the movable carrying member 98 between the trays within the magazine 5 and the non-inserting position but also the movable carrying member 98 is movable in the axial direction of the supporting shaft 95 so that the play means is brought into a position corresponding to the tray separated from the other trays. As a result of such a construction, it is possible to achieve reduction in the size of the player as a whole. The reason why such a construction is advantageous is as follows. As another construction that allows the movable carrying member 98 to be movable in two different directions, it is conceivable, for example, that the movable carrying member 98 is mounted on the supporting shaft 95 so as to be only oscillatable, and a predetermined moving member that is movable in the direction of separating the trays is provided to have the supporting shaft 95 mounted thereon. However, such a conceivable construction requires not only the moving member but also a guide mechanism for movably guiding the moving member in the direction of separating the trays, unlike the present embodiment, thereby increasing not only the number of parts but also the size of the player as a whole.

Further, as is apparent from FIG. 9, the supporting shaft 95 serving as the center of oscillation for the movable carrying member 98 is positioned where the trays are supported by the tray supporting arms 73 to 78 that forms the disk supporting means; i.e., the supporting shaft 95 is positioned further in front than the supported portions 11c, 12c of the trays and located in a position closer to the insertion opening 3a for loading of the magazine 5 formed on the player housing 2 than these supported portions. Such an arrangement of the center of oscillation for the movable carrying member 98 allows a relatively large space to be provided in the middle and the back of the player housing 2. This provides the space for mounting the carrying member drive means and other mechanisms for operating the movable carrying member 98, thereby providing a higher degree of freedom in selecting the installation position of the mechanisms within the player.

Here, the manner in which the disk clamp mechanism is operated also with the power produced by the motor 122 for oscillating the movable carrying member 98 will be described.

Figure 17:
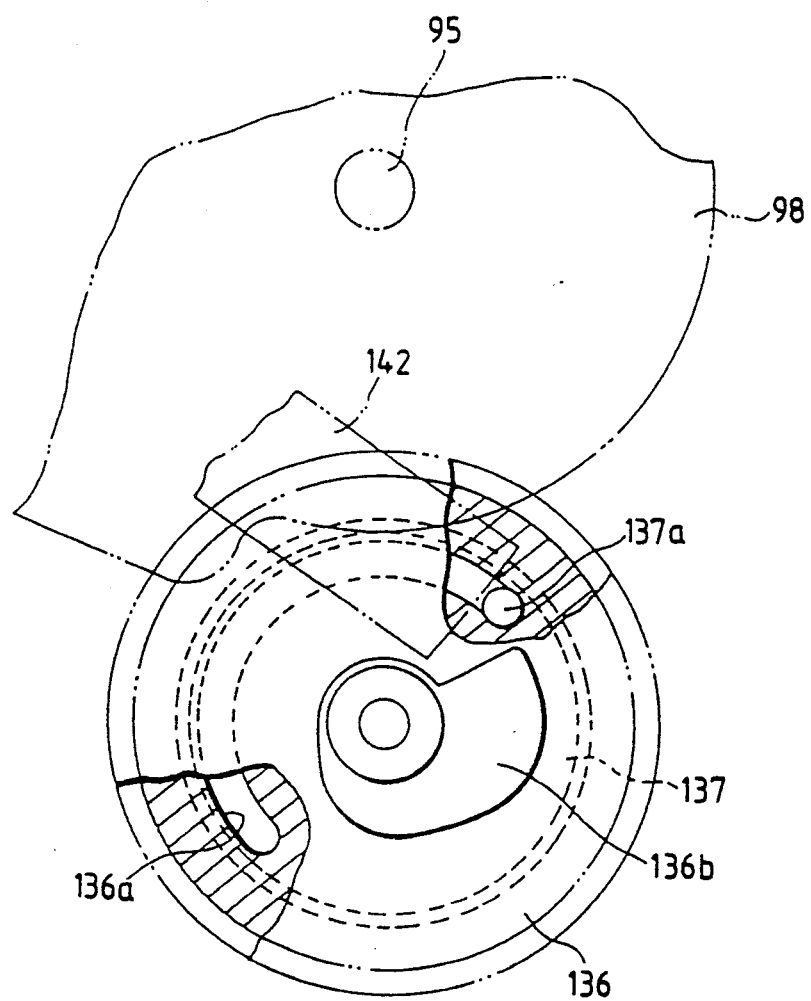
FIG. 17 is an enlarged view including a partial section of part of the internal mechanism shown in FIG. 9.

As shown in FIGS. 9, 16, and 17, on the lower surface of the base end of the movable carrying member 98 is an intermediate lever 142 pivotally mounted by a screw 142a (shown in FIG. 16) within a horizontal plane at the middle thereof. And a cam portion 136b is formed integrally with the gear 136 on the upper surface of the gear constituting the power transmitting mechanism for transmitting the power from the motor 122 to the movable carrying member 98, and the cam surface of the cam portion 136b can be in slidable contact with a suspended portion 142b (see FIG. 16 only in which the reference numeral is given) formed on one oscillating end of the intermediate lever 142. As shown in FIG. 16, the suspended portion 142b is formed also on the other oscillating end of the intermediate lever 142, and a projection 142c arranged on the suspended portion 142b is abutted against a suspended portion 115a formed on the clamper arm 115 constituting the disk clamp mechanism. That is, the cam portion 136b integral with the gear 136 is rotated forward and backward by the power applied from the motor 122 and the cam surface of the cam portion 136b is abutted against one of the suspended portions of the intermediate lever 142 thereby to clamp the suspended portion, whereby the intermediate lever 142 is oscillated around the screw 142a pivotally supporting it, while the projection 142c provided on the other oscillating end of the intermediate lever 142 clamps the suspended portion 115a of the clamper arm 115 thereby to clamp the disk.

Figure 18:
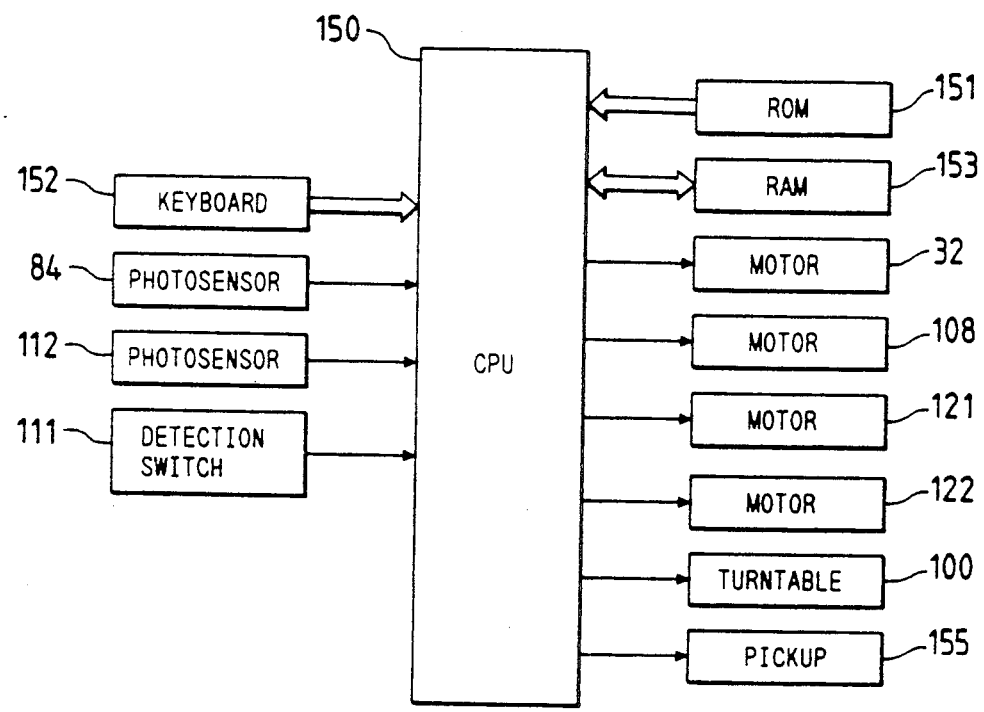
FIG. 18 is a block diagram of a control system of the multidisk-containing player shown in FIGS. 1 to 17.

FIG. 18 shows the construction of a control unit for controlling the operation of the internal mechanisms within the multidisk-containing player thus constructed. A CPU (central processing unit) 150 applies an instruction to the motors 32, 108, 121, 122, the turntable 100, and a pickup 155 according to respective signals from the photosensors 84, 112, and a keyboard 152 including the detection switch 111 and a group of switches (not shown) in cooperation with a RAM 153 based on a control program preset in a ROM 151.

An example of the control program will be described with reference to the flow charts shown in FIGS. 19 to 21 and the diagrams explaining the operation shown in FIGS. 22 to 27.

Figure 19:
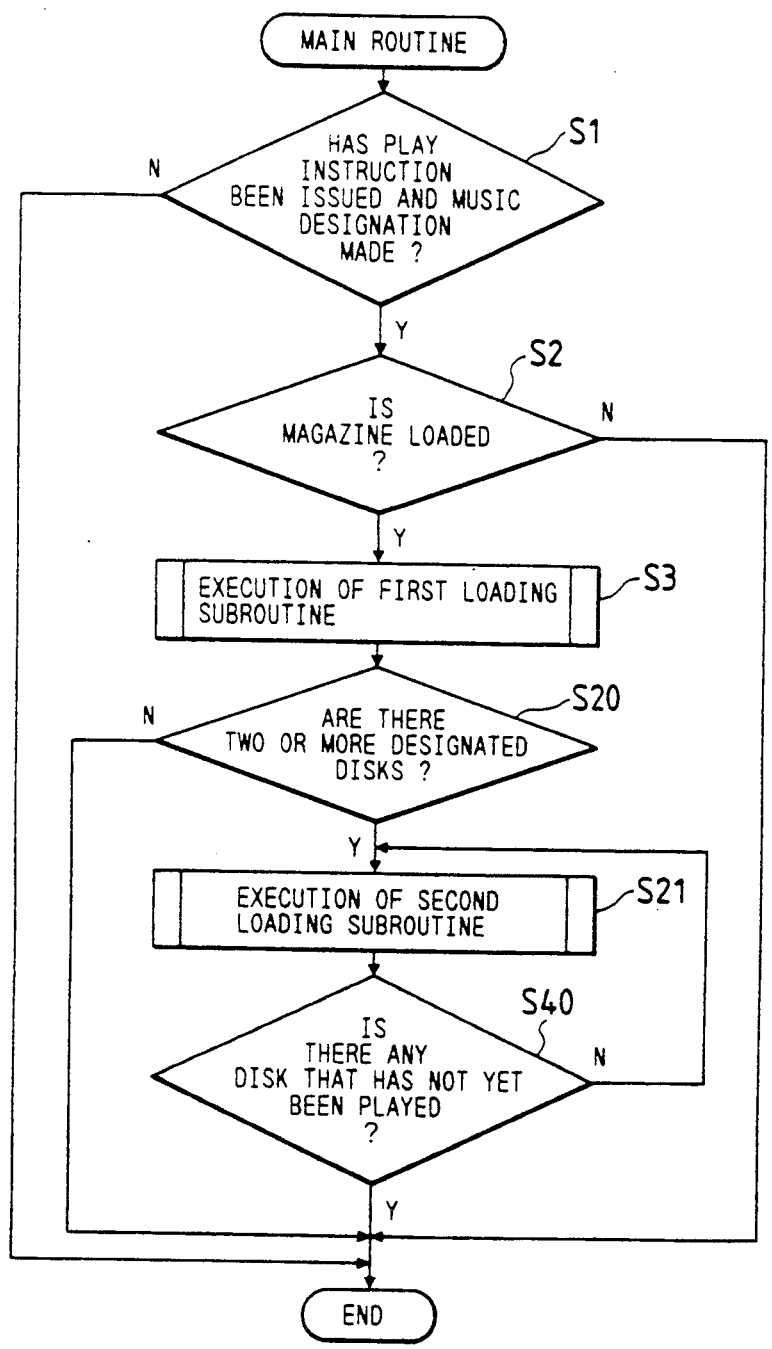
FIGS. 19 to 21 are flow charts for explaining the operation of the multidisk-containing player shown in FIGS. 1 to 17.
Figure 20:
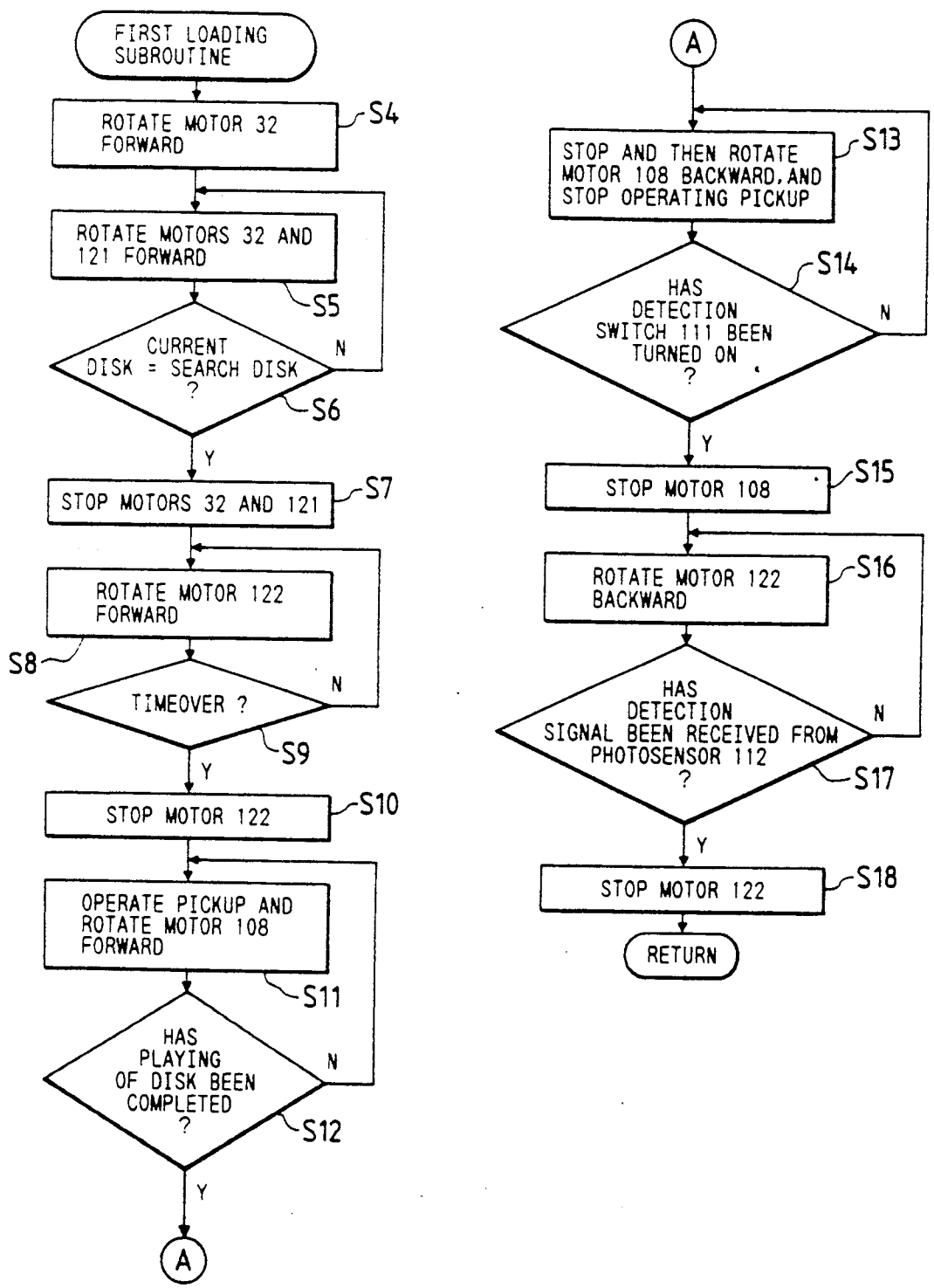
Figure 21:
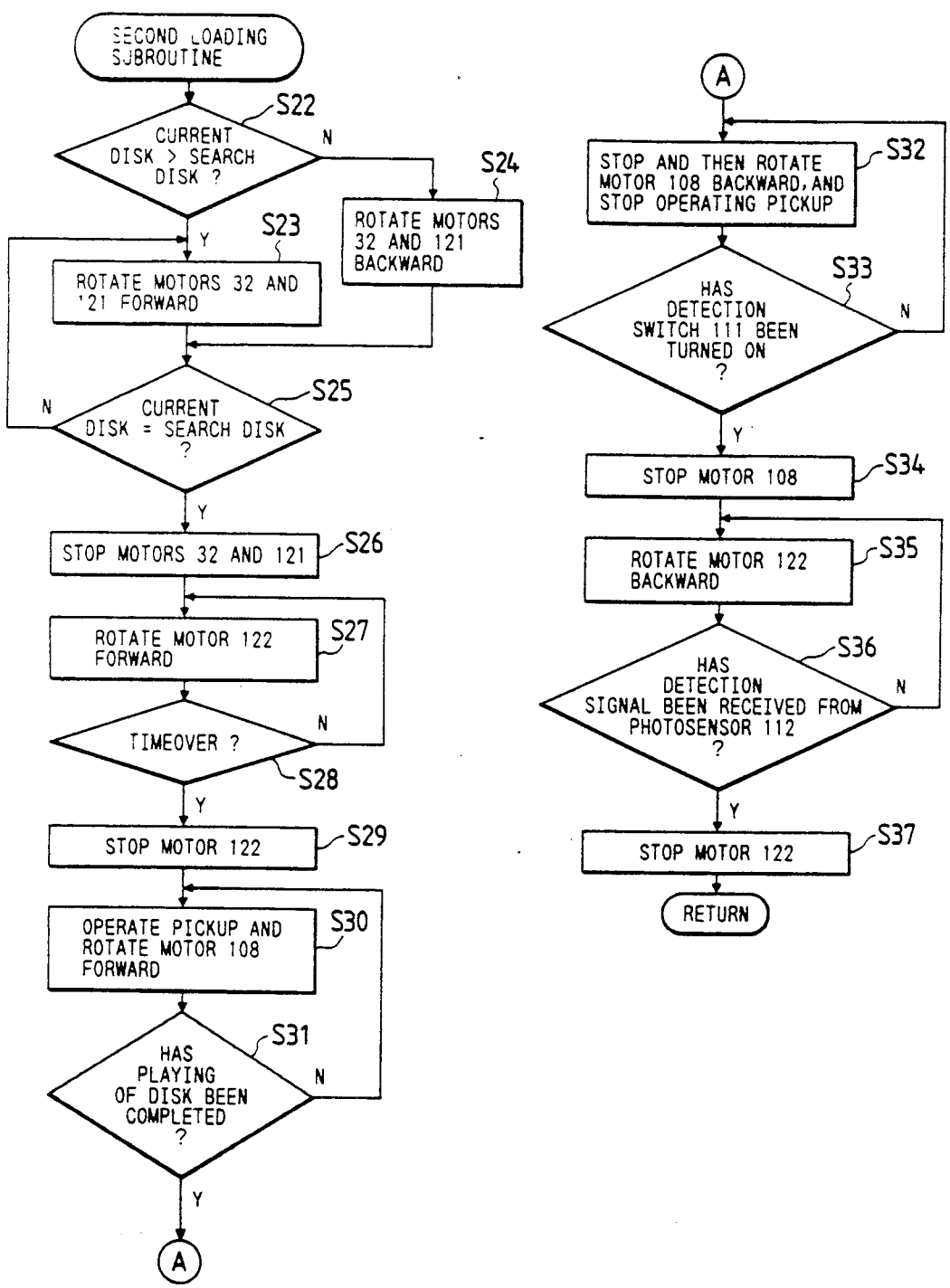

First, when a play instruction has been applied to play a desired disk and a piece of music to be played has been selected with the operation of the keyboard 152 (shown in FIG. 18) by an operator, the multidisk-containing player operates according to the flow charts shown in FIGS. 19 to 21.

As shown in FIG. 19, when the play instruction has been issued and the music to be played has been selected (Step S1), the control unit confirms that the magazine 5 has been loaded into the player housing 2 with a detection signal applied from magazine detection means (not shown) (Step S2). If the magazine 5 has been loaded, the control unit causes each internal mechanism to operate by executing a first loading subroutine shown in FIGS. 19 and 20 (Step S3). In executing the first loading subroutine, the magazine 5 is only loaded in the player housing 2 and the lower and upper members 7, 6 of the magazine 5 have not yet been separated from each other.

Upon having the operator load the magazine 5 into the player housing 2, the guide shaft 25 shown in FIG. 9 clamps the projection 19g of the movable holding member 19 locking the upper and lower members 6, 7 together with the reaction of the loading force. This causes the movable holding member 19 to rotate counterclockwise as viewed in FIGS. 2 and 9, and the projections 19a to 19c of the movable holding member 19 detach from the three cylindrical members 14, 16, 17 held thereby. As a result, the locking of the upper and lower members 6, 7 is released, thereby leaving both members separable. Under this condition, the movable carrying member 98 having the play means including the turntable 100 mounted thereon is set to the non-inserting position shown by the two-dot chain line in FIG. 9.

When the magazine 5 is loaded into the player housing 2, the trays and the supported portions of the lower member 7 are respectively supported by the tray supporting arms 43 to 48 and 73 to 78.

Figure 22:
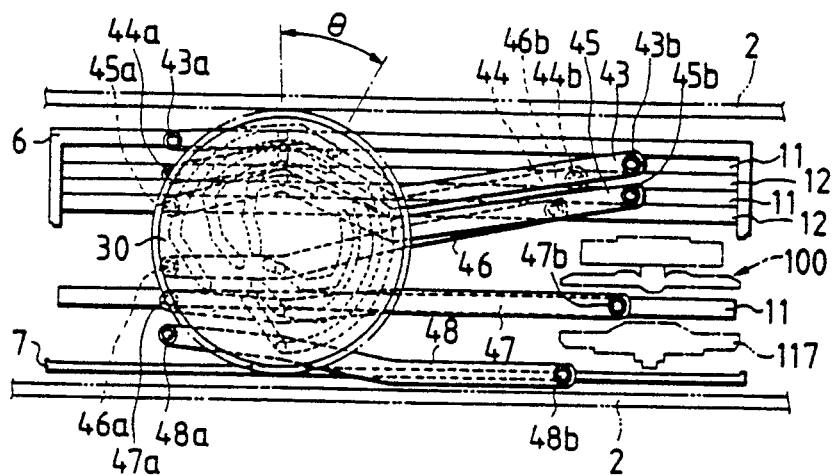
FIGS. 22 to 27 are diagrams for explaining the operation of the multidisk-containing player shown in FIGS. 1 to 17.

As shown in FIG. 20, upon issuance of the instruction, the control unit causes the motor 32 to rotate forward (Step S4) to displace the two cam members 29, 30 only at an angle of $\theta$, e.g., 30°, thereby to cause the tray supporting arms 43 to 48 and 73 to 78 to oscillate from the state shown in FIGS. 11 and 12 to that shown in FIG. 22. Accordingly, the lower member 7 of the magazine 5 is moved downward and separated from the upper member 6. As shown in FIG. 22, at the same time with the separation of the lower member 7 from the upper member 6, the lowermost tray 11 among the five trays accommodated in the magazine 5 is separated from the other trays and brought into a position corresponding to the play means including the turntable 100.

Figure 23:
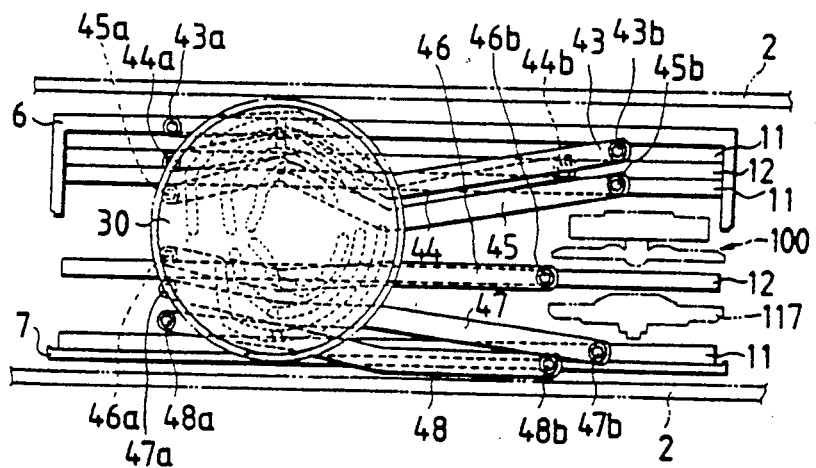
Figure 24:
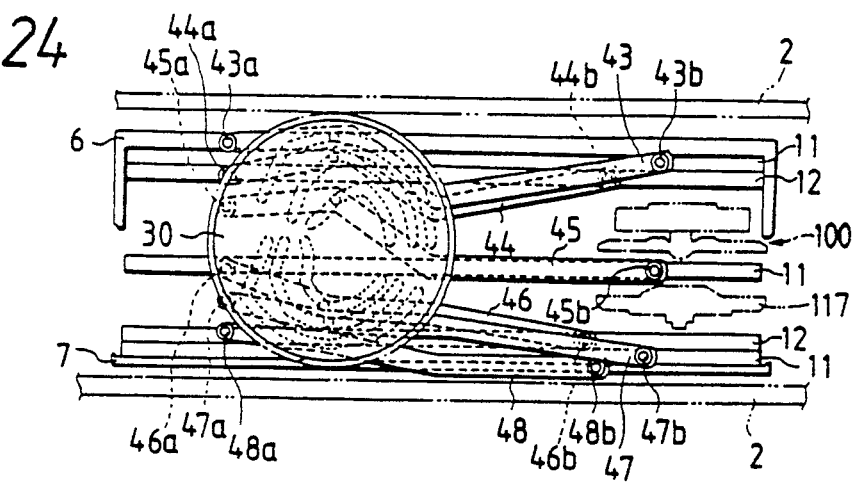
Figure 25:
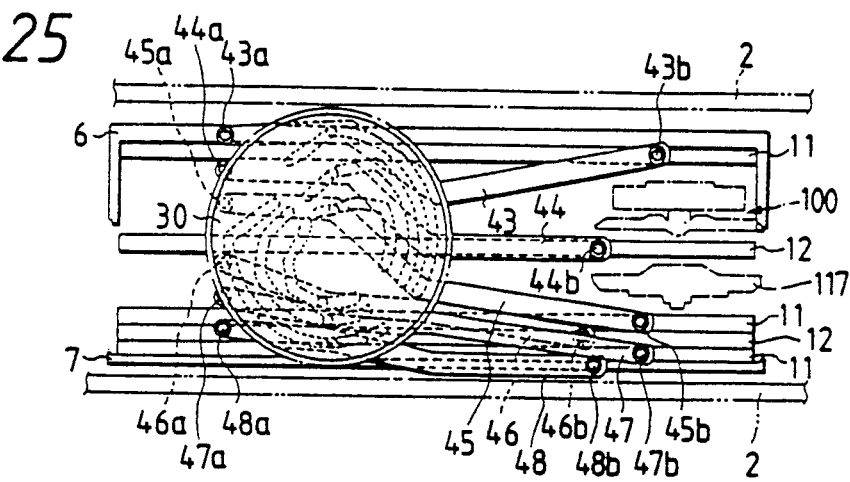
Figure 26:
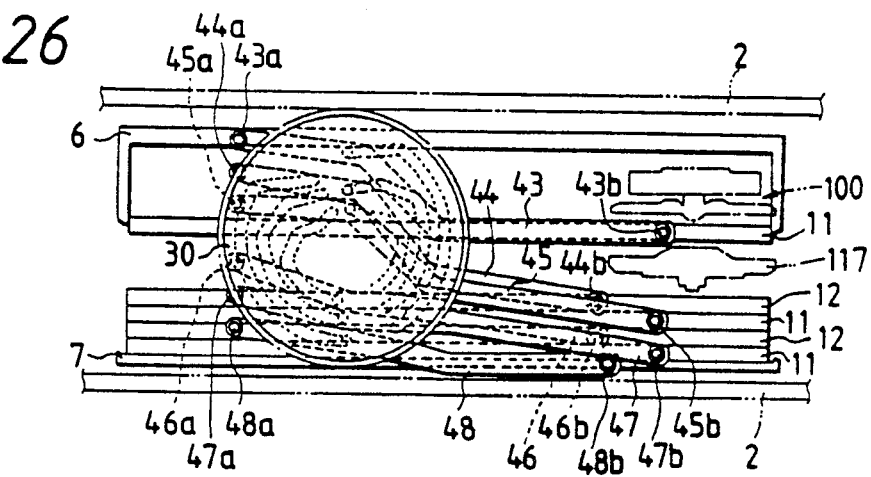

In the case where the disk having a selected piece of music is carried by the third tray 11 from the bottom among the five arrayed trays, the motor 32 is further rotated forward (Step S5) and both cam members 29, 30 are displaced at 60° in synchronism therewith thereby to change the state of the tray from that shown in FIG. 22 to that shown in FIG. 24 through the state shown in FIG. 23. As a result, the tray 11 carrying the desired disk is separated from the other trays. In association with the tray separation operation, the motor 121 is rotated forward (Step S5) to move the movable carrying member 98 carrying the play means upward from the lowermost position by the distance equivalent to the thickness of two trays and to set it at a position corresponding to the tray 11 separated from the other trays. The angles of rotation of both cam members 29, 30 and the distance the movable carrying member 98 moves upward are detected on the basis of the value counted by a counter of the control unit, which counts the address plate 83 and the number of slits 83a, 113a detected by the two photosensors 84, 112. The above operation is performed by comparing the address of a tray currently corresponding to the play means, i.e., the current disk address, with the address of the search disk, which is a disk in search.

When the current disk address coincides with the search disk address (Step S6), the motors 32, 121 are stopped (Step S7). Then, the motor 122 is rotated forward (Step S8) not only to cause the play means to oscillate the movable carrying member 98 from the non-inserting position shown by the two-dot chain line to the inserting position shown by the solid line in FIG. 9 but also to load the turntable 100 to the disk so that the disk will be played by operating the disk clamp mechanism. This operation will further be described in detail.

As described previously, the output of the motor 122 for oscillating the movable carrying member 98 is applied to the movable carrying member 98 sequentially through the gear 132, the face gear 133, the worm 134, the worm wheel 135a, the gears 137, 130b, the cylindrical member 137a, and pin 130a. Before the motor 122 starts to rotate forward, both the arcuate groove 136a formed on the lower main surface of the gear 136 and the pin 137a inserted into the upper main surface of the gear 137 to be slidably fitted with the groove 136a are in such a positional relationship as shown in FIG. 17. When the motor 122 starts rotating forward under this condition, the movable carrying member 98, being biased toward the inserting position (the oscillating position shown by the solid line in FIG. 9) by the spring member 140 mounted on the supporting shaft 95 supporting the movable carrying member 98, is oscillated by the biasing force of the spring member 140. Accordingly, the two gears 136, 137 are rotated in synchronization while maintaining their relative positional relationship as shown in FIG. 17 with the arcuate grooves 136a, 137a arranged thereon. That is, the movable carrying member 98 that is oscillatable by the biasing force of the spring member 140 is only ready to be oscillated by the rotation of the motor 122. Thus, when the movable carrying member 98 is moved up to the inserting position shown by the solid line in FIG. 9, as shown therein, the periphery of the movable carrying member 98 is abutted against a column-like stopper 158 to bring the movable carrying member 98 into the inserting position. If the two gears 136, 137 are formed integrally with each other, the operation of the power transmission system including these two gears is blocked at this stage. However, as described before, both gears 136, 137 remain relatively rotatable within the range in which the pin 137a slides along the arcuate groove 136a.

Figure 27:
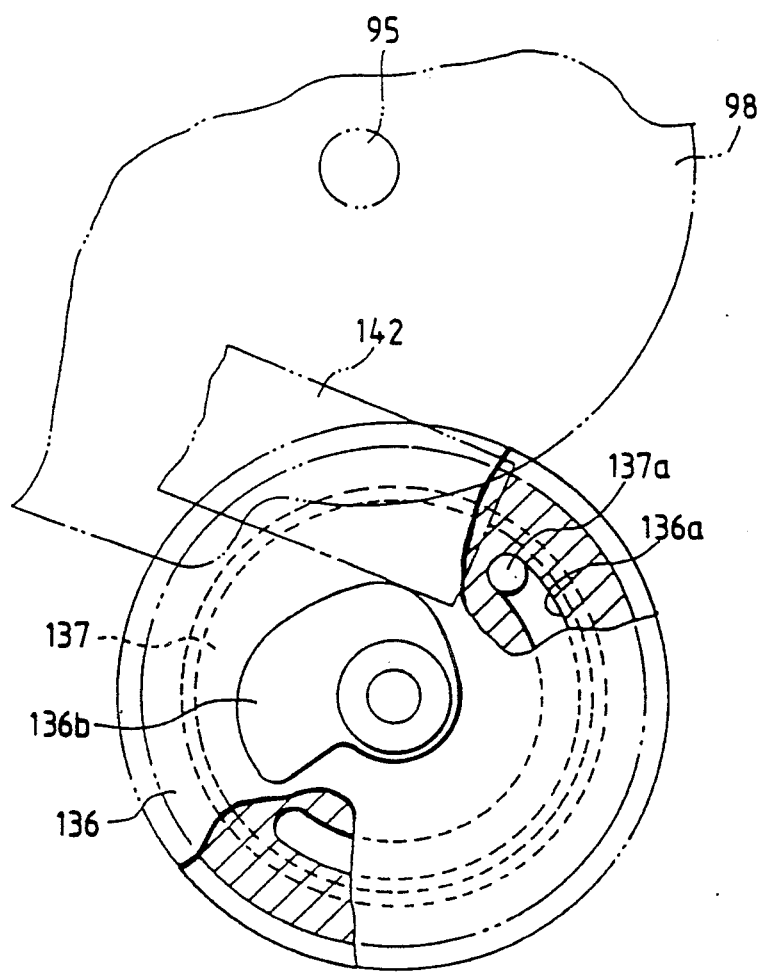

The motor 122 continues rotating forward even after the movable carrying member 98 has been positioned, and as a result, the gear 136 is rotated relative to the other gear 137 that is fixed. As described previously, on the upper main surface of the this gear 136 is the cam member 136b formed integrally therewith, so that, as the gear 136 rotates, the cam member 136b comes into slidable contact with the intermediate lever 142 thereby to oscillate it as shown in FIG. 27. Accordingly, the suspended portion 115a of the clamper arm 115 shown in FIG. 16 is clamped by the projection 142c of the intermediate lever 142 thereby to oscillate the clamper arm 115 from the non-clamp position shown by the two-dot chain line to the clamp position shown by the solid line (in the direction of arrow H), and the clamping member 117, or the clamper, pushes up the disk 9 thereby to detach it from the tray and clamps it to the turntable 100. The cam member 136b is rotated forward and backward after the movable carrying member 98 has reached the inserting position, thereby preventing interference between the maximum diameter of the cam member 136b and the intermediate lever 142. Also, if the clamp is operated while rotating the turntable 100, clamping errors will be reduced.

After the above operation has been performed, the control unit waits for a predetermined time period (shown by Step S9 in FIG. 20). As a result, the control unit confirms that the oscillation of the movable carrying member 98 and the operation of the disk clamp mechanism have been completed, and stops the motor 122 (Step S10). Thereafter, the control unit causes not only the servo-drive means (not shown) of the objective lens 105 included in the pickup and the like to be operated but also the motor 108 to be rotated forward (Step S11) to start moving the carriage 103 with the built-in pickup and start playing the disk.

Upon confirmation of the end of play of the first disk (Step S12), the control unit halts the forward rotation of the motor 108 for driving the carriage 103 and the operation of the pickup, and immediately causes the motor 108 to rotate backward (Step S13). This backward rotation of the motor 108 causes the carriage 103 to come closest to the turntable 100 mounted on the oscillating end of the movable carrying member 98. When the carriage 103 has come closest to the turntable 100, the projection formed on the carriage 103 comes in engagement with the operating strip 111a of the detection switch 111 shown in FIG. 9 to operate the detection switch 111. Based on a detection signal applied from the detection switch 111, the control unit confirms that the carriage 103 has come closest to the turntable 100 (Step S14), and in response thereto, stops the motor 108 to stop the carriage 103 (Step S15).

After the above operation has been performed, the control unit causes not only the motor 122 to rotate backward (Step S16) to release the disk clamp mechanism but also the movable carrying member 98 to oscillate from the inserting position shown by the solid line to the non-inserting position shown by the two-dot chain line in FIG. 9. Since the operations of releasing the disk clamp mechanism and returning the movable carrying member 98 can be performed by reversing the operations of clamping the disk and oscillating the movable carrying member 98 to the inserting position, no further description thereof will herein be given.

As shown in FIG. 9, when the movable carrying member 98 returns to the non-inserting position, the photosensor 112 arranged on the oscillating groove portion of the movable carrying member 98 detects its arrival at a position where the address plate 113 can be detected. The control unit confirms that the returning operation of the movable carrying member 98 has been completed, e.g., on the basis of a detection signal applied from the photosensor 112 (Step S17), and stops the movable carrying member 98 by interrupting the motor 122 (Step S18).

By the way, as is apparent from the above description, in the multidisk-containing player the carriage 103 on the movable carrying member 98 is brought into a position closest to the turntable 100 prior to its returning to the non-inserting position, i.e., non-confronting position with respect to the disk having being played, after the end of playing the disk.

Such a construction allows miniaturization of the player. Because, as shown by the embodiment, the player housing 2 is generally rectangular-pillar-like and the disk contained therein is circular, and this provides a relatively large space at the four corners in the player housing 2. Accordingly, if it is constructed that when the longitudinal movable carrying member 98 is in the non-confronting position, the movable carrying member 98 is positioned close to the inner wall surface of the player housing 2 so as to be along such a surface, the end of the movable carrying member 98 is naturally accommodated in any space at the four corners. Thus, if the movable carrying member 98 returns to the non-inserting position after the carriage 103 has been moved to the end of the movable carrying member 98 upon the end of the play as described above, the space at the corners can be utilized to accommodate the carriage 103 during the non-play time, thereby increasing utilization of the space within the player housing 2 and facilitating miniaturization of the player.

By following a series of operations described above, the playing of a single disk is completed.

As shown in FIG. 19, the control unit confirms whether there still is a designated disk after the completion of the above operations (Step S20). If there are two or more designated disks, the second loading subroutine shown in FIGS. 19 and 21 is executed (Step S21) to cause the internal mechanisms to operate.

In the second loading subroutine, the control unit first confirms that the second disk to be played is to be positioned either upward or downward relative to the disk which has completed the play (Step S22). If the tray carrying the disk designated as the second disk is the tray 11 positioned uppermost among the five arrayed trays, the control unit causes the motor 32 to rotate forward (Step S23) and the two cam members 29, 30 to rotate 60° forward thereby to change the state of the tray from that shown in FIG. 24 to that shown in FIG. 26 through the state shown in FIG. 25 and to separate the uppermost tray 11 from the other trays. Also, in association with the tray separating operation, the motor 121 is rotated forward (Step S23) to raise the movable carrying member 98 carrying the play means by the distance equivalent to the thickness of two trays from the position set by the first loading subroutine, thereby locating the movable carrying member 98 in a position corresponding to the uppermost tray 11 separated from the other trays.

On the other hand, if the second disk to be played is carried by, e.g., the tray 12, the second tray from the top (the fourth from the bottom) among the five arrayed trays, the control unit causes the motor 32 to rotate backward (Step S24) to change the state of the tray from that shown in FIG. 24 to that shown in FIG. 23 thereby to separate this tray 12, which is the second tray from the top, from the other trays. Further, in association with the tray separating operation, the control unit causes the motor 121 to rotate backward (Step S24) to lower the movable carrying member 98 from the position set by the first loading subroutine by the distance equivalent to the thickness of one tray and locates the play means in a position corresponding to the tray 12, the second tray from the top.

When the current disk address coincides with the address of the second disk to be played which is the search disk (Step S25), the motors 32, 121 are stopped (Step S26) and thereafter the mechanisms are operated based on Steps S27 to S37 which are similar to Steps S8 to S18 in the first loading subroutine thereby to start playing the second disk.

Thereafter, as shown in FIG. 19, the control unit checks whether there are any disks, third and so on, not having been played (Step S40), and if there are three or more designated disks, the control unit causes these disks to be played according to the second loading subroutine. When the playing of the designated disks has been completed, the control unit either puts all the mechanisms in a waiting state or brings their operation to an end.

As is apparent from FIGS. 22 to 26, it is so constructed that, among the tray supporting arms 43 to 48 and 73 to 78, a half of the free end of the tray supporting arm supporting the tray separated from the other trays can be placed in parallel with the supported trays. For example, in FIG. 25, the tray supporting arm 44 supporting the tray 12, the second tray from the top, separated from the other trays, has about one-half of its free end placed in parallel with the supported tray 12. Because of such a construction, the play means including the turntable 100 and the movable carrying member 98 having the play means mounted thereon can always be inserted into the trays smoothly without interference with the tray supporting arms, thereby ensuring that the play means can be loaded to the disk properly and smoothly.

As described in the foregoing pages in detail, in the front loading disk player according to the present invention, the movable carrying member carrying the play means made up of the turntable, the pickup, and the disk clamp mechanism is moved to the disk that has been inserted through the insertion opening formed in the player housing and held by the disk holding means to load the play means so that the movable carrying member will be in parallel with the recording surface of the disk.

Because of such a construction, the space to be provided within the player to load the play means into the disk can be reduced to one that is small enough to allow the movement of the movable carrying member of smaller surface area than the disk, thereby achieving miniaturization of the player as a whole and allowing it to be used, e.g., as a car player while accommodated in the dashboard of a car.

What is claimed is:

1. A front loading disk player comprising:
play means including a turntable, a pick-up, and a disk clamp mechanism and provided within a player housing;
means for supporting a disk to be inserted through an insertion opening formed on said player housing;
a movable carrying member for carrying said play means, including a play means transfer mechanism for moving said play means to load said play means including said turntable, said pick-up, and said disk clamp mechanism into said disk, said play means transfer mechanism being movably arranged in parallel with a recording surface of said disk; and
carrying member drive means for moving said movable carrying member;
wherein said front loading disk player has a first space for accommodating said disk and a second space for accommodating said play means during a waiting mode, said play means being moved between said first space and said second space.

2. A front loading disk player according to claim 1, wherein said movable carrying member is pivotally mounted to a cylindrical supporting shaft, said cylindrical supporting shaft being secured to a lower portion of the player housing.

3. A front loading disk player according to claim 1, wherein said play means transfer mechanism includes a cylindrical supporting shaft which is secured to a lower portion of the player housing; and said carrying member drive means includes a cylindrical member rotatably fitted to the outside of said cylindrical support shaft, wherein said movable carrying member is fitted to an upper end of said cylindrical member and is pivotable around said cylindrical supporting shaft.

4. A front loading disk player according to claim 1, wherein said movable carrying member is a flat-plate-like member.

5. A front loading disk player according to claim 3, wherein said movable carrying member is movable along said cylindrical supporting shaft in a direction perpendicular to the recording surface of said disk.

6. A front loading disk player according to claim 1, wherein said disk, which is supported by said supporting means, is not moved in a direction which is parallel to the recording surface of said disk once said supporting means holding said disk is inserted through said insertion opening formed on said player housing.

* * * * *